(12) United States Patent
Sena, Jr. et al.

(10) Patent No.: US 12,381,976 B2
(45) Date of Patent: *Aug. 5, 2025

(54) SYSTEMS AND METHODS FOR PROVIDING CONTEXT DATA ASSOCIATED WITH A COMMUNICATIONS SESSION TO THE CALLED DEVICE

(71) Applicant: Neustar, Inc., Reston, VA (US)

(72) Inventors: Guido Jonjie S. Sena, Jr., Reston, VA (US); Manjul Maharishi, Reston, VA (US); Gaurav Sharma, Reston, VA (US)

(73) Assignee: NEUSTAR, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,905

(22) Filed: Dec. 14, 2023

(65) Prior Publication Data

US 2024/0236231 A1 Jul. 11, 2024

Related U.S. Application Data

(63) Continuation of application No. 17/360,299, filed on Jun. 28, 2021, now Pat. No. 11,889,018, which is a (Continued)

(51) Int. Cl.
*H04M 3/42* (2006.01)
*H04L 67/50* (2022.01)
(Continued)

(52) U.S. Cl.
CPC ...... *H04M 3/42068* (2013.01); *H04L 67/535* (2022.05); *H04M 3/5191* (2013.01)

(58) Field of Classification Search
None
See application file for complete search history.

(56) References Cited

U.S. PATENT DOCUMENTS 6,628,755 B2 9/2003 Shimada et al.
8,085,756 B2 12/2011 Sun et al.
(Continued)

FOREIGN PATENT DOCUMENTS

EP 3200438 A1 8/2017

OTHER PUBLICATIONS

International Search Report mailed May 12, 2020 by ISA/US for Appl. No. PCT/US2020/026653, 2 pages.
(Continued)

*Primary Examiner* — Quoc D Tran
(74) *Attorney, Agent, or Firm* — Sterne, Kessler, Goldstein & Fox P.L.L.C.

(57) ABSTRACT

Systems and methods for providing called devices with sets of context data associated with communication sessions are disclosed. In one implementation, a method for generating context data associated with a communications session may include receiving, from a calling device at a first subsystem, a request to establish a communications session. The request may include a first identifier associated with the calling device. The method may further include receiving, at a second subsystem, activities data associated with the calling device that transmitted the request to establish the communications session. The activities data may include a second identifier associated with the calling device and may be indicative of device activities of the calling device. In addition, the method includes determining, using the first identifier and the second identifier, that the received activities data is associated with the calling device that transmitted the request to establish the communications session, generating context data associated with the communications session based on the received activities data, generating visual content based on the generated context data, and establishing the communications session in response to receiving, (Continued)

from a user of the called device, an input command to accept the request.

20 Claims, 15 Drawing Sheets

Related U.S. Application Data continuation of application No. 16/374,632, filed on Apr. 3, 2019, now Pat. No. 11,057,516.

(51) Int. Cl.
*H04M 1/56* (2006.01)
*H04M 3/51* (2006.01)
*H04M 15/06* (2006.01)

(56) References Cited

U.S. PATENT DOCUMENTS

| | | |
|---|---|---|
| 8,781,103 B2 | 7/2014 | Baranovsky et al. |
| 9,060,059 B2 | 6/2015 | Foster |
| 9,154,615 B1 | 10/2015 | Hedge et al. |
| 9,210,266 B2 | 12/2015 | Lum et al. |
| 9,226,049 B2 | 12/2015 | Grandhi et al. |
| 9,628,615 B2 | 4/2017 | Bangor et al. |
| 9,742,907 B2 | 8/2017 | Nezarati et al. |
| 10,079,939 B1 | 9/2018 | Bostick et al. |
| 11,057,516 B2 * | 7/2021 | Sena, Jr. .............. H04M 3/5191 |
| 11,889,018 B2 * | 1/2024 | Sena, Jr. .............. H04L 67/025 |
| 2014/0044246 A1 | 2/2014 | Klemm et al. |
| 2015/0006529 A1 | 1/2015 | Kneen et al. |
| 2015/0312407 A1 | 10/2015 | Hegde et al. |
| 2018/0241884 A1 | 8/2018 | Converse et al. |
| 2020/0177730 A1 | 6/2020 | Dutta et al. |
| 2020/0322482 A1 | 10/2020 | Sena et al. |

OTHER PUBLICATIONS

Written Opinion mailed May 12, 2020 by ISA/US for Appl. No. PCT/US2020/026653, 4 pages.

Extended European Search Report directed to related European Application No. 20783123.1, mailed on Nov. 29, 2022; 8 pages.

* cited by examiner

SYSTEMS AND METHODS FOR PROVIDING CONTEXT DATA ASSOCIATED WITH A COMMUNICATIONS SESSION TO THE CALLED DEVICE

RELATED APPLICATIONS

This application is a Continuation of U.S. patent application Ser. No. 17/360,299, filed on Jun. 28, 2021, which is a continuation of U.S. patent application Ser. No. 16/374,632 ('632 application), filed Apr. 3, 2019, both of which are incorporated herein by reference in their entireties for all purposes. The '632 application is related to U.S. application Ser. No. 16/374,621 ('621 application), titled "SYSTEMS AND METHODS FOR AUTOMATICALLY AUTHENTICATING COMMUNICATIONS WITH A CALLING DEVICE," which was filed concurrently with the '632 application. The disclosure of the '621 application is also incorporated herein by reference in its entirety for all purposes.

TECHNICAL FIELD

The present disclosure relates to systems and methods for providing context data associated with a communications session. In particular, the disclosure relates to systems and methods for providing a called device with context data that is associated with a communications session and generated based on data indicative of device activities of a calling device.

The present disclosure relates to systems and methods for managing communications with a calling device. In particular, the disclosure relates to systems and methods for managing communications with a calling device based on identity information associated with the calling device or a user of the calling device.

BACKGROUND

Caller ID is a telephone service, available in analog and digital telephone systems, including VoIP, that transmits a caller's telephone number to the called party's telephone equipment when the call is being set up. The caller ID service may further include the transmission of a name associated with the calling telephone number, in a service known as Caller ID Name (CNAM).

However, the information provided to the called party with such a conventional technology is limited. In particular, the caller ID is typically limited to fifteen-character name that is associated with the calling party's phone number.

SUMMARY

In one embodiment, a method for automatically authenticating an incoming call includes receiving a call from a calling device. The call includes an identifier associated with the calling device. The method further includes receiving, separately from the call, authentication data associated with a device or a user, determining, using the identifier and the authentication data, that the authentication data is associated with the same calling device that initiated the call, verifying the authentication data, and based on a result of the verification, determining that the call is initiated by an authenticated device or user.

In one embodiment, a system for generating context data associated with a communications session includes one or more processors configured to receive a call from a calling device. The call includes an identifier associated with the calling device. The processors are further configured to receive, separately from the call, authentication data associated with a device or a user, determine, using the identifier and the authentication data, that the authentication data is associated with the same calling device that initiated the call, verify the authentication data, and based on a result of the verification, determine that the call is initiated by an authenticated device or user.

In one embodiment, a non-transitory computer-readable storage medium stores instructions that when executed by a computer may cause the computer to perform a method for generating context data associated with a communications session. The method includes receiving a call from a calling device. The call includes an identifier associated with the calling device. The method further includes receiving, separately from the call, authentication data associated with a device or a user, determining, using the identifier and the authentication data, that the authentication data is associated with the same calling device that initiated the call, verifying the authentication data, and based on a result of the verification, determining that the call is initiated by an authenticated device or user.

In one embodiment, a method for generating context data associated with a communications session may include receiving, from a calling device at a first subsystem, a request to establish a communications session. The request may include a first identifier associated with the calling device. The method may further include receiving, at a second subsystem, activities data associated with the calling device that transmitted the request to establish the communications session. The activities data may include a second identifier associated with the calling device and may be indicative of device activities of the calling device. In addition, the method includes determining, using the first identifier and the second identifier, that the received activities data is associated with the calling device that transmitted the request to establish the communications session, generating context data associated with the communications session based on the received activities data, generating visual content based on the generated context data, and establishing the communications session in response to receiving, from a user of the called device, an input command to accept the request.

In one embodiment, a system for generating context data associated with a communications session may include one or more processors configured to receive, from a calling device at a first subsystem, a request to establish a communications session. The request may include a first identifier associated with the calling device. The processors may be further configured to receive, at a second subsystem, activities data associated with the calling device that transmitted the request to establish the communications session. The activities data may include a second identifier associated with the calling device and may be indicative of device activities of the calling device. In addition, the processors may be configured to determine, using the first identifier and the second identifier, that the received activities data is associated with the calling device that transmitted the request to establish the communications session, generate context data associated with the communications session based on the received activities data, generate visual content based on the generated context data, and establish the communications session in response to receiving, from a user of the called device, an input command to accept the request.

In one embodiment, a non-transitory computer-readable storage medium stores instructions that when executed by a computer may cause the computer to perform a method for generating context data associated with a communications session. The method may include receiving, from a calling device at a first subsystem, a request to establish a communications session. The request may include a first identifier associated with the calling device. The method may further include receiving, at a second subsystem, activities data associated with the calling device that transmitted the request to establish the communications session. The activities data may include a second identifier associated with the calling device and may be indicative of device activities of the calling device. In addition, the method includes determining, using the first identifier and the second identifier, that the received activities data is associated with the calling device that transmitted the request to establish the communications session, generating context data associated with the communications session based on the received activities data, generating visual content based on the generated context data, and establishing the communications session in response to receiving, from a user of the called device, an input command to accept the request.

DETAILED DESCRIPTION

Figure 1:
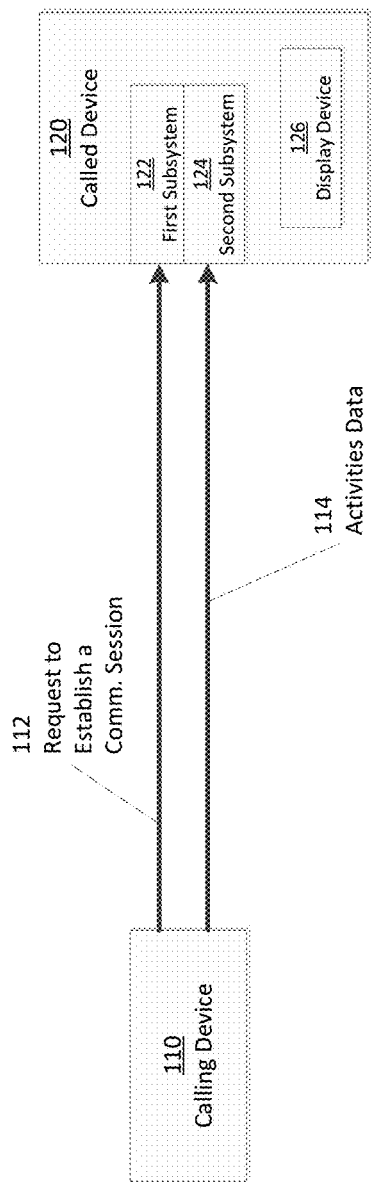
FIG. 1 illustrates an example of a system in accordance with the disclosed embodiments.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Providing Context Data to a Called Device

Aspects of the disclosure relate to systems and methods for providing context data associated with a communications session. In particular, the disclosure relates to systems and methods for providing a called device with context data that is associated with a communications session and generated based on data indicative of device activities of a calling device.

The disclosed systems and methods may be capable of providing a user of a called device with context for an incoming call. For example, the disclosed systems and methods may be capable of providing identification of one or more products that a caller (i.e., a user of the calling device) may be interested in discussing during the call. In this example, the disclosed systems and methods may identify such products based on, for example, a web page the caller was viewing and/or data that was being displayed by an application executing on the calling device before the call was placed. In another example, the disclosed systems and methods may be capable of providing identification of one or more reasons, or likely reasons, why the caller placed the call based on, for example, web browsing histories on the calling device and/or a list of keywords used by the caller for web searches before the call was placed. In these examples, the identified products and/or reasons for placing the call may be displayed on the called device, and based on the displayed information, the user of the called device may provide efficient and personalized call experience for the caller. Alternatively, or additionally, the identified products and/or reasons for placing the call may be used to transfer the call to an appropriate person or system (e.g., manually by a user of the called device, or automatically based on analysis of the identified products/reasons). In some instances, the identified products and/or reasons for placing the call may be used by the called device to automatically decline the incoming call.

In one implementation, a called device may receive a request to establish a communications session (e.g., an incoming telephone call) from a calling device. The request to establish a communications session ("the request") may be received at a first subsystem of the called device and include a first identifier associated with the calling device. For example, a system operated by a customer support representative may receive, at a telephone subsystem, an incoming telephone call from a cellular phone of a customer. In this example, the first identifier may include a telephone number of the cellular phone and/or a Caller ID Name (CNAM) associated with the telephone number.

Before and/or after receiving the request, the called device may further receive activities data from the calling device. The activities data may be indicative of device activities of the calling device. For example, the activities data may include data indicative of internet activities of the calling device (e.g., internet browsing history), data indicative of activities within one or more software programs executing on the calling device (e.g., state data for an app executing on the calling device), data generated based on user inputs received at the calling device, and/or data generated based on visual content that was being displayed when an input command to transmit the request to establish a communications session was received.

The activities data may be received at a second subsystem of the called device. In some embodiments, the second subsystem may be different from the first subsystem, for example, because the first subsystem (e.g., a telephone subsystem) may not be capable of receiving non-voice data, such as the activities data. The activities data may include a second identifier associated with the calling device, which may be the same or different from the first identifier. The second identifier may include, for example, an IP address or a domain name associated with the calling device.

After receiving both the request and the activities data, the called device may determine that the received activities data is associated with the calling device that transmitted the request, for example, using the first and second identifiers associated with the calling device. Such a determination may be performed by the calling device for many reasons. For example, such a determination may be performed because the request and the activities data are among a plurality of requests and sets of activities data received by the called device from a plurality of calling devices. In another example, such a determination may be performed because the request and the activities data are received at different subsystems and/or at different times. In yet another example, such a determination may be performed because the first identifier included in the request (e.g., a phone number) and the second identifier included in the activities data (e.g., an IP address) do not match.

In some embodiments, the called device may access an identity database to determine that the received activities data is associated with the calling device that transmitted the request. In these embodiments, the identity database may accept a query containing an identifier (e.g., a phone number) and return a set of related identifiers (e.g., network addresses of devices associated with the phone number, and social media usernames associated with the phone number). Thus, the called device may determine that the received activities data is indeed associated with the calling device that transmitted the request if the identity database, in response to receiving the first identifier included in the request, returns the second identifier included in the activities data.

Subsequently, the called device may generate context data based on the received activities data and/or the request. The context data may be generated based on analysis of the activities data and/or the request. Alternatively, or additionally, the context data may include at least a portion of data included in the activities data and/or the request. The context data may include, for example, identification of products, or types of products, that the user of the calling device is likely to be interested in discussing during the communications session, identification of reasons for requesting a communications session, identities associated with the user of the calling device, purchase history of the user of the calling device, personal information of the user of the calling device, and shopping preferences of the user of the calling device. After generating the context data, the called device may generate visual content based on the context data. Further, the generated visual content may be displayed on the called device and/or a display unit associated with the called device.

Examples of an Operating Environment

FIG. 1 illustrates an example of a communications system 100 in which concepts consistent with the principles of the invention may be implemented. As shown in FIG. 1, system 100 includes a calling device 110 and a called device 120. Further as shown in FIG. 1, called device 120 may include a first subsystem 122, a second subsystem 124, and a display device 126.

Calling Device/Called Device

In system 100, calling device 110 may be any device capable of transmitting a request 112 to establish a communications session (e.g., placing of a call) and activities data 114. Correspondingly, called device 120 may be any device capable of receiving request 112 and activities data 114 originating from calling device 110.

In some embodiments, a device (e.g., calling device 110 or called device 120) may include a portable communications device. For example, a device may include a cellular phone, a tablet, a laptop, a smart home device (e.g., Amazon Alexa, Google Home, Apple Siri) and/or a smart watch. In some embodiments, a device may include an internet-of-things (IOT) device and/or a home appliance. For example, a device may include a home-assistance program integrated with a home appliance. In some embodiments, a device may include a plurality of devices. For example, a device may include a phone and a computer connected to the phone. In another example, a device may include a plurality of workstations, each workstation including a phone and a computer (e.g., customer support representatives, 911 call center).

Subsystems of Called Device

As shown in FIG. 1, request 112 in system 100 may be received at first subsystem 122 (e.g., a telephone system) of called device 120, and activities data 114 may be received at second subsystem 124 (e.g., a computer) of called device 120. In some embodiments, first subsystem 122 may be different from second subsystem 124. In these embodiments, first subsystem 122 may be different from second subsystem 124, for example, because first subsystem 122 (e.g., a telephone) may not be capable of receiving non-voice data, such as activities data 114.

As used herein, a subsystem may be a software program, a network socket/port, a physical network interface, and a virtual network interface of a device, to provide some examples. Thus, in some embodiments, request 112 may be received at a first network socket/port (e.g., a port associated with Voice-over-LTE, a port associated with a VoIP protocol) while activities data 114 may be received at a second network socket/port (e.g., a port assigned to a third-party app executing on called device 120). In some embodiments, request 112 may be received by a software program executing on called device 120 (e.g., a VoIP application, a Smartphone Operating System, a telephone application) while activities data 114 may be received by another software program executing on called device 120 (e.g., a third-party app executing on called device 120). In some embodiments, request 112 may be received at a first network interface (e.g., LTE 3GPP network interface) while activities data 114 may be received at a second network interface (e.g., a Wi-Fi network interface).

Communications Session

As used herein, a communications session is considered to have been established when calling device 110 is able to transmit data to called device 120 and/or when called device 120 is able to transmit data to calling device 110. Alternatively, a communications session is considered to have been established when calling device 110 is able to receive data from called device 120 or when called device 120 is able to receive data from calling device 110.

In system 100, a communications session may be established between calling device 110 and called device 120 after calling device 110 transmits request 112 to establish a communications session. In some embodiments, request 112 may be transmitted in response to receiving an input command from a user of calling device 110. For example, request 112 may be transmitted in response to a user entering a phone number and/or pressing a "dial" button on calling device 110. In another example, request 112 may be transmitted in response to a user clicking on a link/button on a website configured to contact a customer support call center associated with the website. In yet another example, request 112 may be transmitted in response to a user pressing a button on an application executing on calling device 110. In some embodiments, request 112 may be transmitted after one or more preconfigured conditions are met. For example, request 112 may be transmitted after an application executing on calling device 110 is in a predefined state (e.g., the application has been idle on a product page for more than one minute). In some embodiments, request 112 may be transmitted in response to a voice command from a user of calling device 110. In some embodiments, request 112 may be transmitted in response to a sensor reading from a user of calling device 110. For example, after a heart rate sensor detects a dangerously low-level of heart rate, request 112 may be transmitted to a nearest health care facility.

In some embodiments, the communications session may be established after called device 120 accepts request 112 to establish a communications session. For example, a communications session may be established after called device 120 answers the incoming call. In some embodiments, called device 120 may automatically accept request 112 upon receiving request 112. Alternatively, called device 120 may accept request 112 after receiving an input command from a user of called device 120 to accept request 112. In some embodiments, the communications session may be established after a successful handshake process between calling device 110 and called device 120.

In some embodiments, request 112 may include a first identifier associate with calling device 110. The first identifier may be an identifier compatible with first subsystem 122 of called device 120 receiving request 112. For example, request 112 may include a phone number associated with calling device 110, which is compatible with a telephone subsystem of called device 120. In another example, request 112 may include a Caller Name ID (CNAM) entry associated with called device 120, which is also compatible with the telephone subsystem of called device 120. In another example, request 112 may include a network address of calling device 110 (e.g., MAC, IP address, device name for a network), which is compatible with a network subsystem (e.g., ethernet network interface) of called device 120. In yet another example, request 112 may include a user identifier associated with a user of calling device 110 for a VoIP service and compatible with a VoIP subsystem of called device 120. In some embodiments, an identifier may be included in request 112 by calling device 110. In some embodiments, an identifier may be included in request 112 en route to called device 120. For example, a Caller ID Name (CNAM) may be added to request 112 by a communications service provider (CSP) of called device 120 (i.e., by the terminating CSP). In some embodiments, the first identifier may be included in request 112 as a part of meta data. For example, an IP address of calling device 110 may be included in request 112 as a part of a packet header used to transport request 112. In some embodiments, request 112 may include a device identifier associated with calling device 110 such as Device ID, IMSI, and/or IMEI. In some embodiments, request 112 may include biometric data captured by calling device 110 or an authentication token generated by calling device 110. Activities data 114 may further include, for example, identifier of an application(s) that is current executing on calling device 110. In some embodiments, activities data 114 may include Picture (or a URL to a picture) or vCard/JCard (JSON-based contact info) associated with calling device 110 and/or its user.

In system 100, a communications session may be established over one or more communication networks. For example, a communications session may be established over public-switched telephone network (PSTN), the Internet, and/or one or more private communications networks (e.g., a core network of a CSP). Moreover, a communications session may be established using one or more communications technologies, including one or more media, protocols, receivers, and/or transmitters. For example, a communications session may be established using one or more of the following communication technologies: Voice-over IP (VOIP), Ethernet, Wi-Fi, Bluetooth, 3G, 4G, 4GPP/LTE, 5G, near-field communication (NFC), and Bluetooth. In some embodiments, a communications session may be established using one or more software programs available to execute on calling device 110 and/or called device 120. For example, a communications session may be established using an app (e.g., WhatsApp, Skype, Viber) available to execute on a cellular phone.

In some embodiments, a communications session may include a voice (e.g., a phone call), video, and/or a text communications session (e.g., SMS, MMS, IM). In embodiments where the communications session includes a voice communications session, calling device 110 and/or called device 120 may include, or have access to, a microphone for capturing audio. In embodiments where the communications session includes a video communications session, calling device 110 and/or called device 120 may include, or have access to, a camera and/or a screen. In embodiments where the communications session includes a text communications session, calling device 110 and/or called device 120 may include, or have access to, a keyboard, a speaker (e.g., for reading the received and/or sent text communication), and/or a screen.

In embodiments where calling device 110 and/or called device 120 includes, or have access to, a screen, the screen may be capable of displaying visual content, which may include a static visual content (e.g., a photograph) and/or a dynamic visual content (e.g., a video or an animation). In some embodiments, calling device 110 and/or called device 120 may further include, or have an access to, an interface for interacting with the displayed visual content. For example, the screen may be a touchscreen and the displayed visual content may respond to the touch (e.g., by changing the displayed visual content based on the location of the touch). In another example, calling device 110 and/or called device 120 may include, or have an access to, an input device such as a mouse or a microphone that can be used to interact with the displayed visual content. In some embodiments, the interactive visual content may be used to communicate with called device 120 and/or another device associated with the called party. For example, the input from the input device may be transmitted to called device 120 and/or another device associated with the called party.

Activities Data

In system 100, activities data 114 may be generated by calling device 110 and include data indicative of device activities of calling device 110. As used herein, device activities may include operations performed by calling device 110.

In some embodiments, device activities may include data collection operations performed by calling device 110. Thus, in some embodiments, activities data 114 may include at least a portion of the collected data and/or meta data (e.g., data source, collection time/date, etc.) associated with the collected data. Alternatively, or additionally, activities data 114 may include data generated based on at least a portion of the collected data (e.g., results of analyzing the collected data) and/or the meta data associated with the collected data. The collected data may include, for example, data from sensors (e.g., motion sensor, GPS, heart rate sensor), data retrieved from another device on a network, and captured user inputs.

In some embodiments, device activities may include data output operations performed by calling device 110. Thus, in some embodiments, activities data 114 may include data that was displayed, or is being displayed, on calling device 110 (e.g., displayed data from a visited webpage). Alternatively, or additionally, activities data 114 may include at least a portion of data that was used to generate a visual output on calling device 110 (e.g., HTML source code of a visited webpage). In some embodiments, activities data 114 may include one or more links (e.g., URL) pointing to data that was used to generate a visual output on calling device 110. For example, device activities may include addresses of webpages that was displayed, or is being displayed, on calling device 110. In some embodiments, device activities may include output data generated by one or more software programs executing, or was executed, on calling device 110.

In some embodiments, device activities may include activities of one or more users on calling device 110. Thus, in some embodiments, activities data 114 may include, for example, data indicative of one or more users' login history, internet browsing history, application usage history, call history, and/or SMS/IM history on calling device 110. Additionally, or alternatively. activities data 150 may include identification of one or more software programs currently being used by the user and/or data indicative of the user's current activity within the identified applications (e.g., whether the user is idle, whether the user is browsing, and/or whether the user is typing). In some embodiments, activities data 114 may include internet cookies stored on calling device 110 and/or data generated based on the internet cookies stored on calling device 110.

In embodiments where the device activities include activities of a plurality of users on calling device (e.g., family of three using a single smart home device), activities data 114 may include meta data for pieces of activities to identify the specific user that the activities are associated with.

In some embodiments, device activities may include state data. For example, activities data 114 may include state data for one or more software program executing, or available to execute, on calling device 110. The state data for a software program may include, for example, authentication status (e.g., whether a user is logged in or not), and/or identity data (e.g., a username). In some embodiments, the device activities data may include data captured from various sensors (e.g., heart rate) on calling device 110.

In system 100, activities data 114 received at called device 120 may include a second identifier associate with calling device 110. In some embodiments, the second identifier included in activities data 114 may be the same (or the same type) as the first identifier included in request 112. Alternatively, the second identifier included in activities data 114 may be different (or different type) from the first identifier included in request 112.

In one example, activities data 114 may include a phone number associated calling device 110, which is compatible with a telephone subsystem of called device 120. In another example, activities data 114 may include a network address of calling device 110 (e.g., MAC, IP address, device name for a network), which is compatible with a network subsystem of called device 120. In yet another example, activities data 114 may include a user identifier associated with a user of calling device 110 for a third-party software program and compatible with a corresponding subsystem (e.g., a server associated with the third-party software program executing on called device 120). In some embodiments, an identifier may be included in activities data 114 by calling device 110. In some embodiments, an identifier may be included in activities data 114 en route to called device 120. For example, an identifier may be added to activities data 114 by an intermediary device (e.g., a router, a gateway, and/or a proprietary server) located on a communications path between calling device 110 and called device 120. In some embodiments, the second identifier may be included in activities data 114 as a part of meta data. For example, an IP address of calling device 110 may be included in activities data 114 as a part of a packet header used to transport activities data 114. In some embodiments, activities data 114 may include device identifiers of calling device 110, such as Device ID, IMSI, IMEI. In some embodiments, activities data 114 may include biometric data captured by calling device 110 or an authentication token generated by calling device 110. Activities data 114 may further include, for example, identifier of an application(s) that is current executing on calling device 110 and/or module(s) that are with in the application(s) (e.g., "help" module of an application).

In some embodiments, activities data 114 may be transmitted by calling device 110 in response to an input command from a user of calling device 110 to request a communications session. For example, activities data 114 may be transmitted in response to a user entering a phone number and/or pressing a "dial" button. In another example, activities data 114 may be transmitted in response to a user clicking on a link/button on a website configured to contact a customer support representative associated with the website. In yet another example, activities data 114 may be transmitted in response to a user pressing a button on an application executing on calling device 110. In some embodiments, activities data 114 may be transmitted in response to calling device 110 transmitting request 112 or preparing to transmit request 112.

In some embodiments, activities data 114 may be transmitted after determining that an authorized user of calling device 110 has approve transmission of activities data 114. Such an approval process may be implemented to protect privacy of users of calling device 110. In these embodiments, activities data 114 may be transmitted periodically, after one or more predetermined events, and/or based on a predetermined schedule. For example, after an authorized user of calling device 110 approves transmission of activities data 114, calling device 110 may begin transmitting activities data 114 based on a schedule configured by the authorized user.

In some embodiments, activities data 114 may be transmitted after the communications session is established between calling device 110 and called device 120. In some embodiments, a plurality of sets of activities data 114 may be transmitted at different times. For example, a set of activities data 114 may be transmitted before the communications session is established, and another set of activities data 114 may be transmitted after the communications session is established. In this example, each set of activities data 114 may include data indicative of device activities since the last activities data 114 was transmitted. Alternatively, each set of activities data 114 may include at least some of the data that was included in the previously transmitted sets of activities data 114. In some embodiments, activities data 114 may be transmitted continuously, or periodically, before and/or after the communications session is established.

In some embodiments, activities data 114 may include device activities of calling device 110 during a predetermined time period. For example, activities data 114 may include device activities of calling device 110 during a predetermined number of minutes/hours prior to the transmission of request 112 and/or activities data 114. In some embodiments, activities data 114 may include device activities of calling device 110 after the communications session is established. In some embodiments, activities data 114 may include device activities of calling device 110 after the communications session is established and before the communications session is terminated. In some embodiments, activities data 114 may include device activities of calling device 110 at the time the communications session is established, request 112 is transmitted, activities data 114 is generated, and/or activities data 114 is transmitted.

Context Data

As shown in FIG. 1, request 112 and activities data 114 in system 100 may be destined for called device 120. After receiving request 112 and activities data 114, in system 100, called device 120 may determine that activities data 114 is associated with the same device that transmitted request 112 (i.e., calling device 110), for example, by determining that the first identifier included in request 112 is related to the second identifier included activities data 114. As discussed above, such a determination may be performed by calling device 110 for many reasons. For example, such a determination may be performed because request 112 and activities data 114 are among a plurality of requests 112 and sets of activities data 114 received by called device 120 from a plurality of calling devices. In another example, such a determination may be performed because request 112 and activities data 114 are received at different subsystems of called device 120 and/or at different times. In yet another example, such a determination may be performed because an identifier included in request 112 (e.g., a phone number) and an identifier included in activities data 114 (e.g., an IP address) do not match and/or are of different type.

In embodiments where request 112 and activities data 114 both include the same or the same type of identifiers that are associated with calling device 110, called device 120 may compare the identifier(s) included in request 112 and the identifier(s) included in activities data 114 to determine that activities data 114 and request 112 indeed originate from, or are associated with, the same device. In some embodiments, as will be described in detail with respect to FIG. 3, one or more identity databases that provide identifiers that are related to a queried identifier may be used to determine that activities data 114 originate from the same device that transmitted request 112. In some embodiments, machine learning techniques may be used (e.g., by called device 120 or another device) to determine that activities data 114 is likely to have originated from the same device as request 112. In some embodiments, one or more data sources (e.g., data extracted/queried from a social media platform) may be used to determine that activities data 114 originate, or likely originate, from the same device that transmitted request 112. In some embodiments, certificate-based authentication techniques may be used to determine that activities data 114 is associated with the same device that transmitted request 112 (i.e., calling device 110).

In some embodiments, request 112 and/or activities data 114 may be encrypted before being transmitted by calling device 110.

After called device 120 receives request 112 and activities data 114, as discussed above, context data may be generated. In some embodiments, the context data may be generated by called device 120. Alternatively, the context data may be generated by another device connected to called device 120. For example, called device 120 may forward at least a portion of request 112 and/or activities data 114, and/or data generated based on at least a portion of request 112 and/or activities data 114, to a context data generator. In this example, the context data generator may generate context data based on the receive data. The context data may subsequently transmit the generated context data to called device 120. In system 100, the context data may be generated based on activities data 114 or based on request 112 and activities data 114.

As discussed above, context data may provide a user of called device 120 (or a software program executing on called device 120) with context for the requested communications session, which can be used by a user of called device 120 (or a software program executing on called device 120) to provide, for example, efficient and personalized communications experience to a user of calling device 110. In particular, the context data may include, for example, identification of products that a user of calling device 110 may be interested in discussing during the requested communications session, identification of one or more reasons why the user of calling device 110 is requesting a communications session, data extracted/captured/derived from a website or an app that the user was viewing or has viewed, and identities associated with the user (e.g., a username). Such context data may be used by a user of called device 120 (or a software program executing on called device 120), for example, to recommend a similar product, forward a communications session (or request 112) to another user, avoid asking standard intake questions (e.g., "why are you calling today?," "what's your username?").

In some embodiments, context data may be generated based on an analysis of activities data 114 or based on analysis of both activities data 114 and request 112. In some embodiments, context data may include at least a portion of activities data 114 and/or request 112. For example, the context data may include a portion of a screenshot of an app or a portion of text from a website.

In embodiments where a plurality of sets of activities data 114 are received by called device 120, the context data may be generated based on the plurality of sets of activities data 114. Alternatively, in embodiments where a plurality of sets of activities data 114 are received by called device 120, a plurality of sets of context data may be generated based on the plurality of sets of activities data 114. For example, a first set of context data may be generated based on a first set of activities data 114, and a second set of context data may be generated based on a second set of activities data 114 and/or the first set of activities data 114.

Visual Content

After the context data is generated, called device 120 may generate visual content based on the generated context data, and display the generated visual content on a display device associated with, or included in, called device 120 (e.g., display device 126). The visual content may include, for example, at least a portion of the context data. Alternatively, or additionally, the visual content may include, for example, data generated based on at least a portion of the context data. For example, the visual content may include a chart and/or a table that is generated based on the context data. In some embodiments, the visual content may include a status information (e.g., loyalty status, current status of an application being completed by calling device 110). In some embodiments, the visual content may include health related data, such a chart of heartbeat for the last hour, or other health related information that can aid in speeding up the diagnosis or triage.

Furthermore, in some embodiments, the visual content may be displayed before the communications session is established. For example, the visual content may be displayed before a user of called device 120 accepts request 112. In this example, the user may use the displayed visual content to decide whether to accept request 112. Alternatively, or additionally, the user may use the displayed visual content to decide whether to transfer the request 112 and/or the destination of the transfer. In some embodiments, the visual content may be displayed after the communications session is established. For example, the visual content may be displayed after a user of called device 120 accepts request 112. In this example, the user may use the displayed visual content to provide personalized and efficient communications experience to a user of calling device 110.

In some embodiments, the displayed visual content may change after it is first displayed. For example, first visual content may be displayed before the communications session is established, and updated visual content may be displayed after the communications session is established. In this example, the first visual content may be used by the user of called device 120 to decide whether to accept request 112 while the updated visual content may be used by the same user, after the communications session is established, to provide a personalized and/or an efficient communications experience to the user of calling device 110; the first and second visual content may be generated based on the same context data. In embodiments where a plurality of sets of context data are generated, a plurality of sets of visual content may be generated based on the plurality of sets of context data. For example, first visual content may be generated based on a first set of context data, and after a second set of context data is received, updated visual content may be generated based on the second set of context data.

In some embodiments, the visual content may dynamically change as the user of calling device 110 operates calling device 110 during the established communications session. For example, as the user of calling device 110 operates calling device 110 during the communications session (e.g., based on instructions of a user of called device 120), calling device 110 may transmit additional set(s) of activities data 114, which in turn causes called device 120 to generate additional set(s) of context data and visual content.

Figure 2:
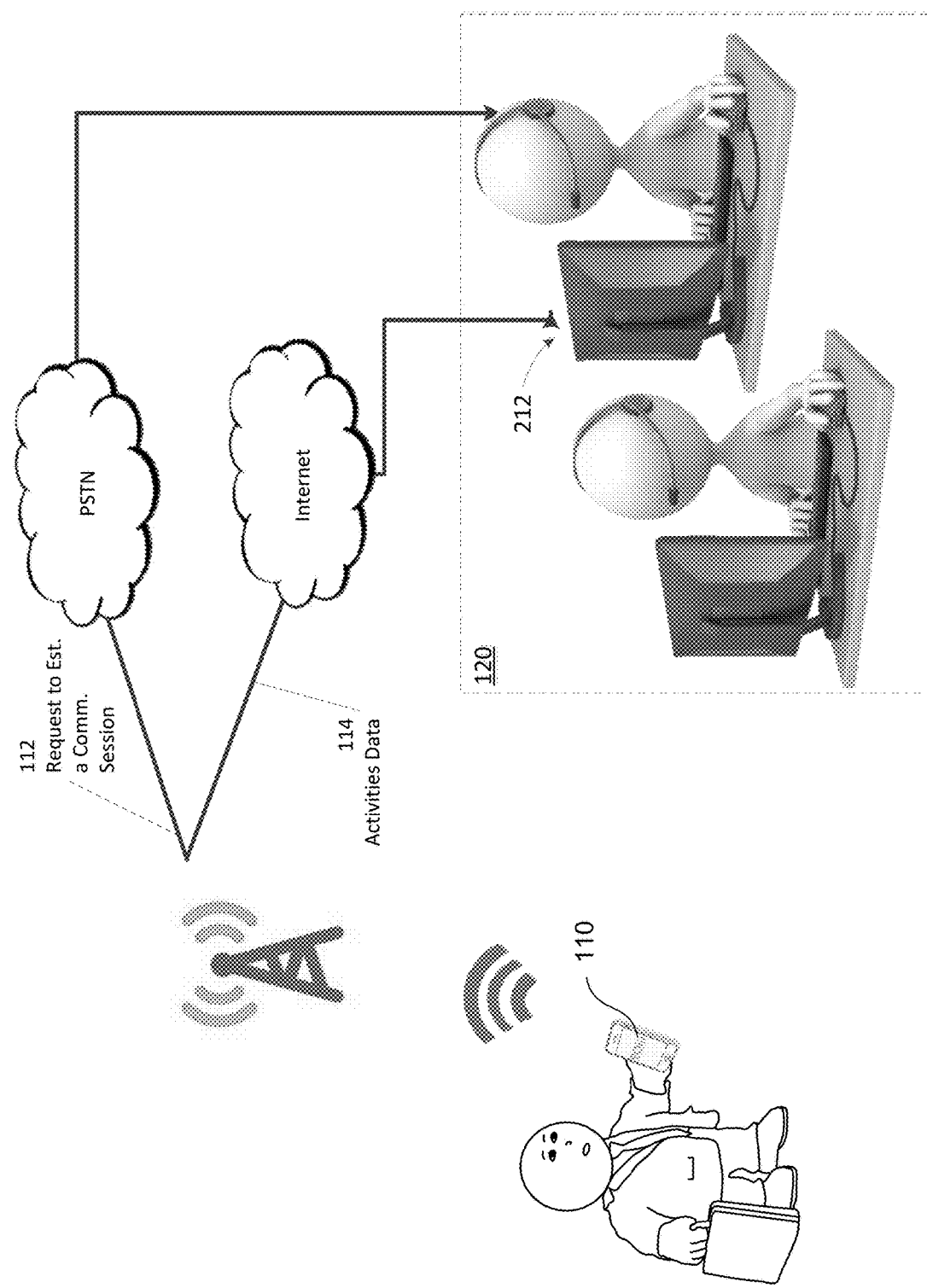
FIG. 2 illustrates another example of a system in accordance with the disclosed embodiments.

FIG. 2 illustrates another example of a communications system 200 in accordance with the disclosed embodiments. System 200 is similar to system 100 of FIG. 1, except that calling device 110 in system 200 is a smartphone and called device 120 in system 200 is a call center including at least one workstation 212. Workstation 212 in FIG. 2 includes, for example, a telephone system and a computer operated by a user. In particular, workstation 212 may be operated by a technical support representative trained to provide technical support for a software program executing on smartphone 110. In the example of FIG. 2, smartphone 110 may dial a phone number of the call center (i.e., transmit request 112) after a user of the smartphone clicks on a button within the software program. Further, smartphone 110 may transmit activities data 114 that includes, for example, a log generated by the software program. Subsequently, request 112 may be received by a VoIP subsystem of workstation 212 while activities data 114 may be received by a proprietary server software executing on a computer associated with workstation 212.

After receiving request 112 and activities data 114, workstation 212 in system 200 may generate context data. In the example of FIG. 2, the context data may include data that indicates that the incoming call relates to a technical question relating to the software program. The context data may further include data that includes identification of technical problems the user of the smartphone may be experiencing and/or potential solutions to the identified problems. Such context data may be generated by analyzing the log included in activities data 114. Thus, in the example of FIG. 2, the technical support representative, using the visual content generated based on the context data, may provide efficient technical support to the user of smartphone 110. For example, the technical support representative may forego many of the questions for identifying and diagnosing the technical problem.

Figure 3:
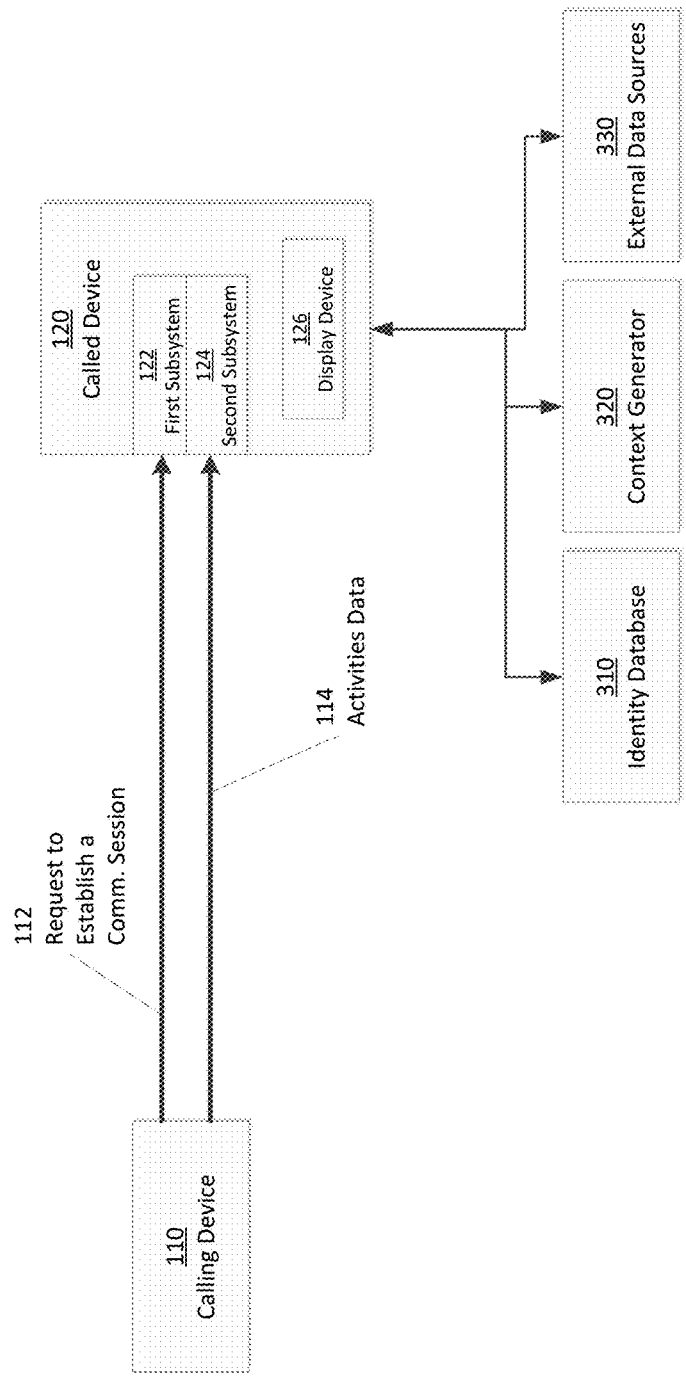
FIG. 3 illustrates yet another example of a system in accordance with the disclosed embodiments.

FIG. 3 illustrates yet another example of a communications system 300 in accordance with the disclosed embodiments. System 300 is similar to system 100 of FIG. 1, except that system 300 further includes an identity database 310, a context generator 320, and/or an external data source 330.

In system 300, identity database 310 may accept a query that includes an identifier and return a set of identifiers that are known, or likely, to be related to the queried identifier. For example, identify database 310 may accept a query that includes a phone number and return phone numbers, names, username, email addresses, device identifiers, and/or network addresses that are related to the queried phone number. In some embodiments, identity database 310 may periodically access one or more data sources (e.g., data from a social media platform) to add and/or index entries of identifiers and their related identifiers. In some embodiments, identity database 310 may dynamically access one or more data sources to determine related identifiers. In some embodiments, identity database 310 may include a Caller ID Name (CNAM) database that accepts a query including a phone number and returns a name associated with the queried phone number. In some embodiments, identity database 310 may include one more physical and/or virtual servers. In some embodiments, at least a portion of identity database 310 may be implemented on a cloud platform, such as, but not limited to, Google Cloud, Amazon Web Services, and/or Microsoft Azure. In system 300, the results from identify database 310 may be used to determine whether request 112 and activities data 114 originate, or likely originate, from the same device.

Context generator 320 in system 300 may receive at least a portion of activities data 114 and/or request 112 from called device 120, generate context data based on the received data, and transmit the generated context data to called device 120. In some embodiments, context generator 320 may include one or more physical and/or virtual servers. In some embodiments, at least a portion of context generator 320 may be implemented on a cloud platform, such as, but not limited to, Google Cloud, Amazon Web Services, and/or Microsoft Azure. In some embodiments, context generator 320 may use machine learning techniques to generate the context data. In some embodiments, called device 120 and context generator 320, as a collective, may generate context data. For example, called device 120 may generate a portion of context data while context generator 320 may generate another portion of context data. In another example, called device 120 may transmit analysis of activities data 114 to context generator 320, and context generator 320 may use the received analysis to generate the context data.

As shown in FIG. 3, system 300 may further include an external data source 330. In system 300, data source 330 may include, for example, one or more social media platforms, websites, and/or external databases (e.g., customer database of a communications service provider). In system 300, data collected from data sources 330 may be analyzed by called device 120 to determine whether request 112 and activities data 114 originate from the same device or whether request 112 and activities data 114 are likely to be originating from the same device. Additionally, or alternatively, data collected from data sources 330 may be analyzed by called device 120 and/or context generator 320 to generate the context data.

In one example, external data source 330 may be a social media website. In this example, called device 120 may access a page in the social media website that is associated with an identifier included in request 112 (e.g., a username for the social media website). Subsequently, called device 120 may search the page and extract other identifiers, such as, email addresses, phone numbers, etc. If one of the extracted identifier is included in activities data 114, called device 120 may determine that the identifiers included in request 112 and activities data 114 are related.

In yet another example, external data source 330 may be a directory for a company. In this example, called device 120 may query the directory using an identifier included in request 112 (e.g., an email address having a domain name of the company). The query may return other related identifiers. If the returned identifiers include an identifier included in activities data 114, called device 120 may determine that the identifiers included in request 112 and activities data 114 are related.

In some embodiments, called device 120 may always query one or more predetermined databases 310 and/or data sources 330 to determine whether request 112 and activities data 114 originate from the same device. Alternatively, or additionally, called device 120 may select one or more data sources and/or one or more identity databases to use to determine whether request 112 and activities data 114 originate from the same device. In these embodiments, one or more data sources and/or one or more identity databases may be selected based on a number of factors. For example, called device 120 may identify the type of identifier(s) included in request 112 and/or activities data 114, and based on the identifier type, called device 120 may select one or more data sources and/or one or more identity databases to query. In another example, called device 120 may use a portion of the identifier(s) (e.g., area code, domain name in an email address) included in request 112 and/or activities data 114 to select one or more data sources 330 and/or one or more identity databases 310 to query. In some embodiments, geo-location and/or IP-address-to-location map may be used determine whether request 112 and activities data 114 originate from the same device.

Similarly, called device 120 may always use context generator 320 to generate context data. Alternatively, called device 120 may elect to use context generator 320 based on a number of factors. For example, called device 120 may identify the type of device activities included activities data 114, and based on the identified device activities, called device 120 may elect to use, or elect not to, use context generator 320 to generate context data. In some embodiments, system 300 may include a plurality of context generators, and called device 120 may select a set of context generators to use based on a number of factors. For example, called device 120 may identify the type of device activities included activities data 114, and based on the identified device activities, called device 120 may select a set of context generators to use from the plurality of context generators.

Figure 4:
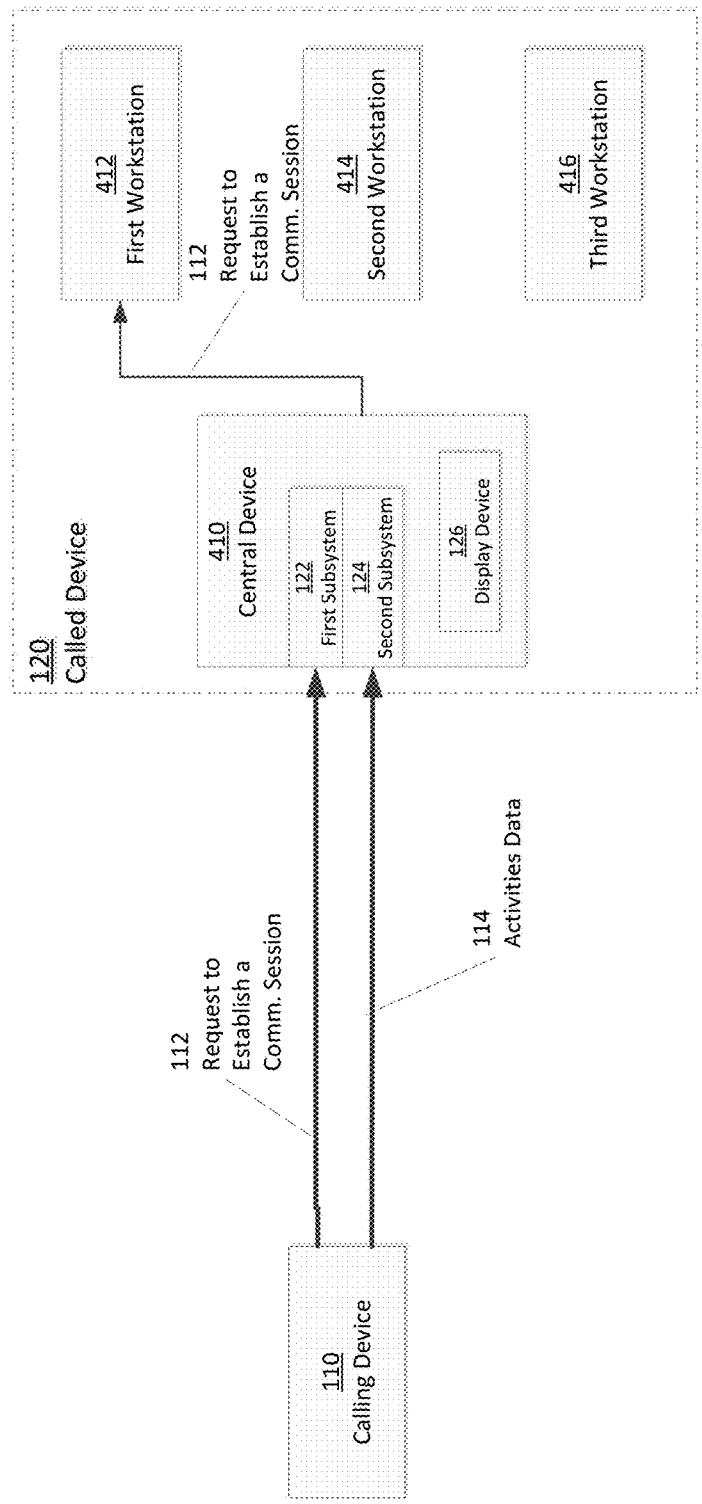
FIG. 4 illustrates yet another example of a system in accordance with the disclosed embodiments.

FIG. 4 illustrates yet another example of a system 400 in accordance with the disclosed embodiments. System 400 is similar to system 200 of FIG. 2, except that called device 120 in system 400 includes a central device 410 in addition to a plurality of workstations 412, 414, and 414. In system 400, central device 410 may receive request 112 and activities data 114, and based on the received request 112 and activities data 114, central device 410 may generate context data. The context data may be used by central device 410 to determine the most appropriate workstation to forward request 112. For example, in FIG. 4, based on the generated context data, central device 410 is forwarding request 112 to first workstation 412. In this example, central device 410 may further forward the generated context data to first workstation 412. In some embodiments, central device 410 may first accept request 112 and forward the established communications session to the most appropriate workstation.

Examples of Dialing Software Program

Figure 5A:
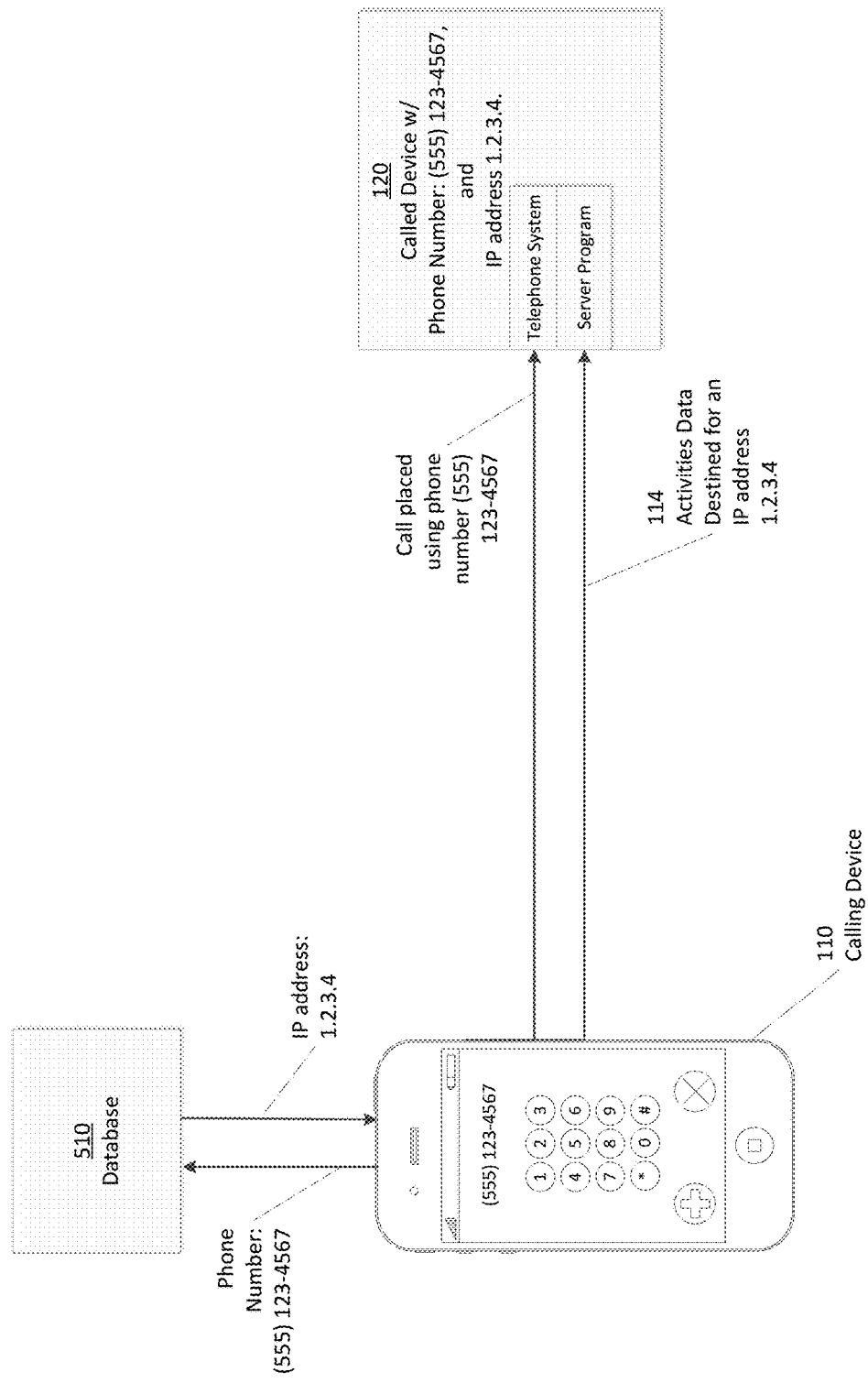
FIG. 5A illustrates an example of a dialing software program of a calling device in accordance with the disclosed embodiments.

FIG. 5A illustrates an example of a dialing software program 500 executing on calling device 110 in accordance with the disclosed embodiments. In FIG. 5A, dialing software program 500 may be used by a user of calling device 110 to enter a phone number and place a call (i.e., transmit request 112) to called device 120.

In the example of FIG. 5A, the subsystem of called device 120 that can receive the call (e.g., a telephone system) may not be capable of receiving activities data 114. Therefore, calling device 110 may transmit activities data 114 to a different subsystem of called device 120 capable of receiving activities data 114. For example, calling device 110 may transmit activities data 114 destined for a port of called device 120 associated with a server program for receiving activities data 114. However, in the example of FIG. 5A, the server executing on called device 120 may not be reachable using the phone number entered on dialing software program 500. Rather, a different identifier, such as an IP address, may be needed to transmit activities data 114 to the same device.

To that end, calling device 110 of FIG. 5A may have access to a database containing a list of phone numbers and an IP address (and/or a URL) that is associated with each phone number. Thus, in the example of FIG. 5A, after a user enters the phone number, calling device 110 (or dialing software program 500) may access such a database to determine the IP address associated the entered phone number. Subsequently, calling device 110 may transmit the generated activities data 114 to called device 120 using the associated IP address. In some embodiments, the database may be included in calling device 110. Alternatively, or additionally, the database may be external to the calling device 110. In some embodiments, the entries of the database may be added by a user to opt-in to the service and/or removed by a user to opt-out of the service.

Figure 5B:
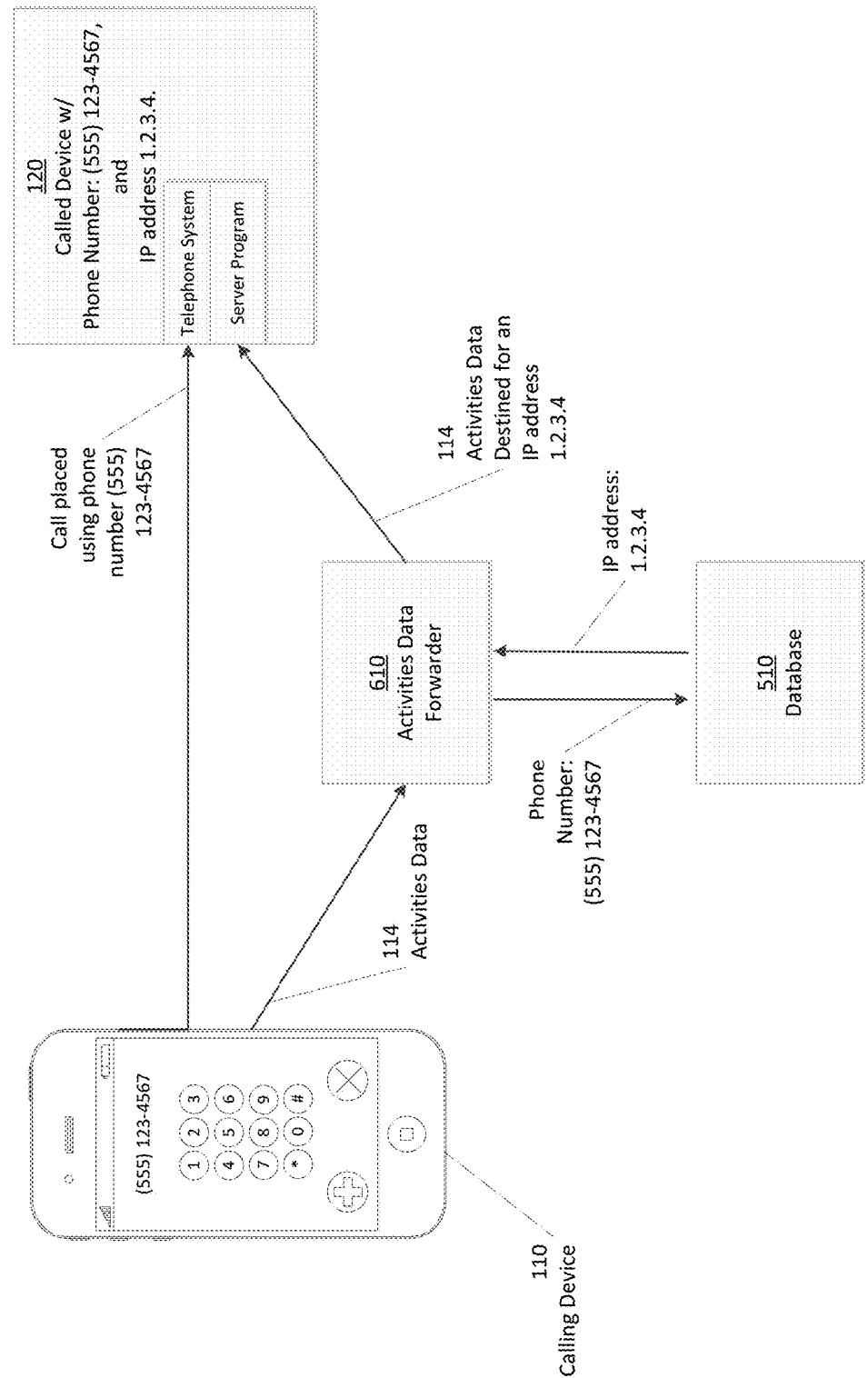
FIG. 5B illustrates an example of a dialing software program of a calling device in accordance with the disclosed embodiments.

In FIG. 5A, activities data 114 may include device activities of calling device 110 prior to execution of dialing software program 500. For example, activities data 114 may include an address or a copy of a webpage that was being displayed, an identifier of the last-used app, a list of keywords used for web searches, etc. In some embodiments, database 510 may be external to calling device 110. In some embodiments, database 510 may be a registry where businesses and/or individuals can add/remove/modify records involving their own phone numbers and/or P addresses. FIG. 5B illustrates another example of a dialing software program 525 executing on calling device 110 in accordance with the disclosed embodiments. Dialing software program 525 is similar to dialing software program 500 of FIG. 5A, except that activities data 114 is forwarded to an activities data forwarder 610. After receiving activities data 114, activities data forwarder 610 may determine the IP address associated with the phone number (e.g., by accessing database 510) and forward the activities data 114 to the associated IP address. In some embodiments, activities data forwarder 610 may include database 510. In some embodiments, called device 120 may query activities data forwarder 610 for the activities data 114.

Figure 5C:
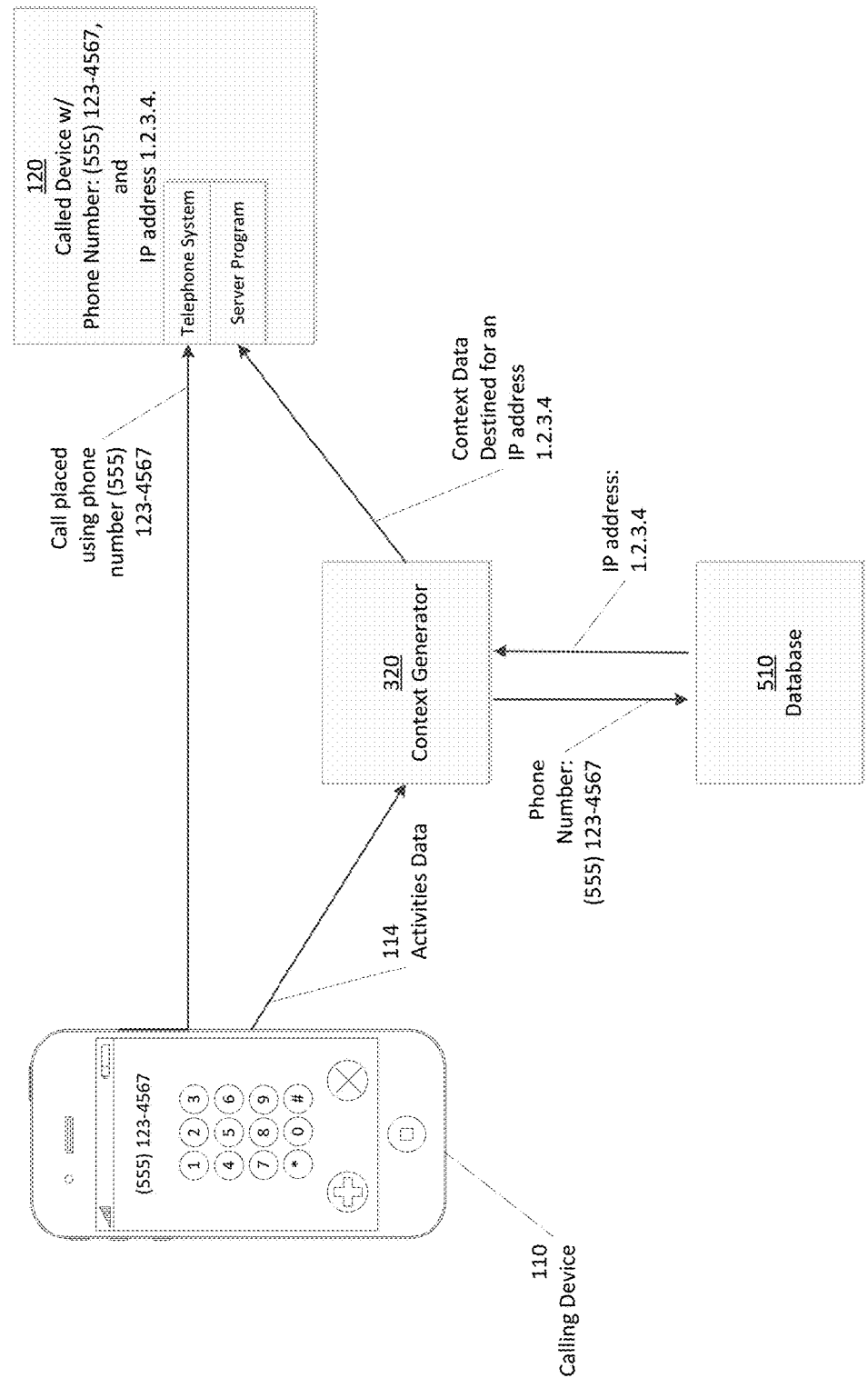
FIG. 5C illustrates an example of a dialing software program of a calling device in accordance with the disclosed embodiments.

FIG. 5C illustrates yet another example of a dialing software program 550 executing on calling device 110 in accordance with the disclosed embodiments. Dialing software program 550 is similar to dialing software program 525 of FIG. 5B, except that activities data 114 is forwarded to context generator 320 described with respect to FIG. 3. After receiving activities data 114, context generator 320 may determine the IP address associated with the phone number (e.g., by accessing database 510), generate context data based on the received activities data 114, and transmit the generated context data to the associated IP address. In some embodiments, called device 120 may query context generator 320 for the context data.

Figure 6:
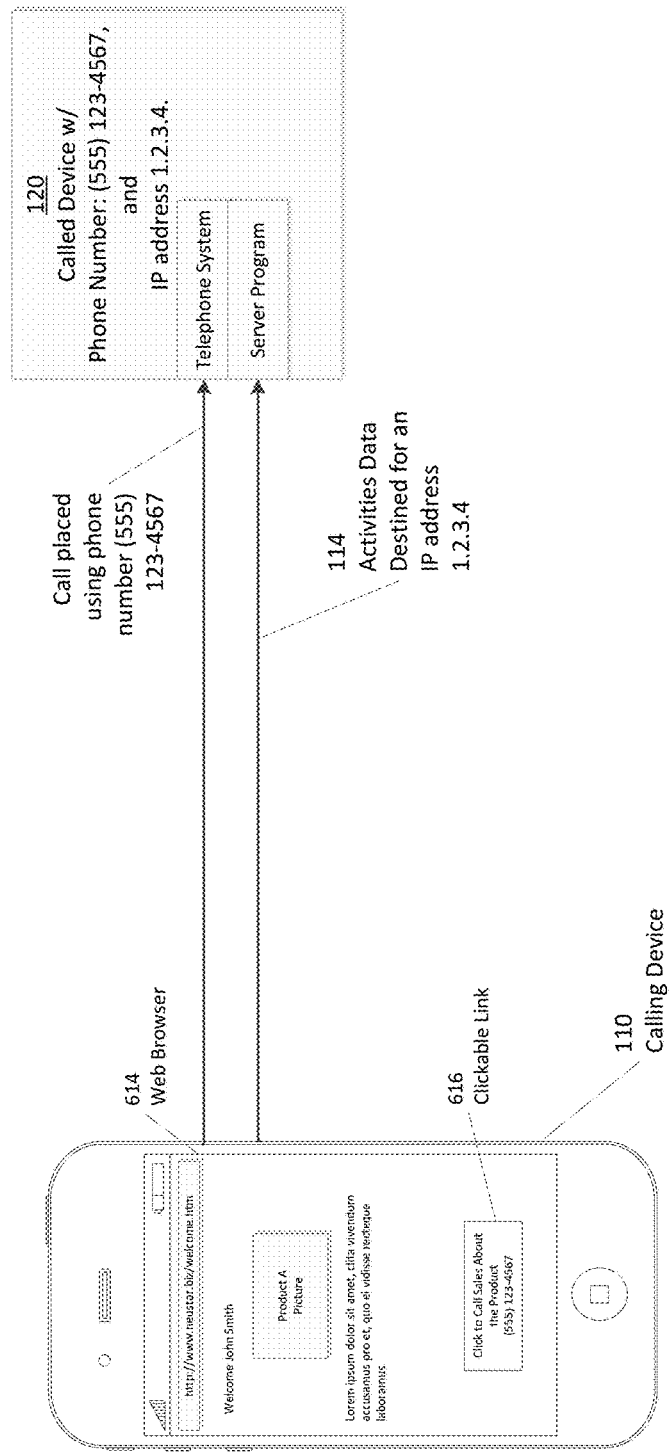
FIG. 6 illustrates an example of a web browser executing on a calling device in accordance with the disclosed embodiments.

FIG. 6 illustrates an example of a web browser 614 executing on calling device 110 in accordance with the disclosed embodiments. In FIG. 6, clickable link 616 in web browser 614 may be configured to, when clicked, transmit request 112 to establish a communications session. For example, after clickable link 616 is clicked, web browser 614 may cause calling device 110 to place a call using a phone number. In another example, after clickable link 616 is clicked, web browser 614 may request, and/or cause calling device 110 to request, a VoIP communications session, request a video conferencing, and/or request a text-based chat session using one or more user identifiers. In these examples, the phone number and/or identifiers may be embedded in clickable link 615.

Similar to the example of FIG. 5A, in FIG. 6, the subsystem of called device 120 receiving request 112 to establish a communications session may not be capable of receiving activities data 114. Therefore, calling device 110 may transmit activities data 114 instead to a different subsystem of called device 120, such as a subsystem capable of receiving activities data 114. For example, calling device 110 may transmit activities data 114 destined for a port of called device 120 associated with a server program for receiving activities data 114.

In some embodiments, the IP address and/or the domain name may be embedded in clickable link 616 or in the webpage. Alternatively, or additionally, similar to dialing software program 500 of FIG. 5A, calling device 110 may determine the IP address of called device 120 using the phone number or the identifier(s) embedded in clickable link 615 (e.g., by accessing database 510). Subsequently, calling device 110 may transmit the generated activities data 114 to called device 120 using the IP address.

Figure 7:
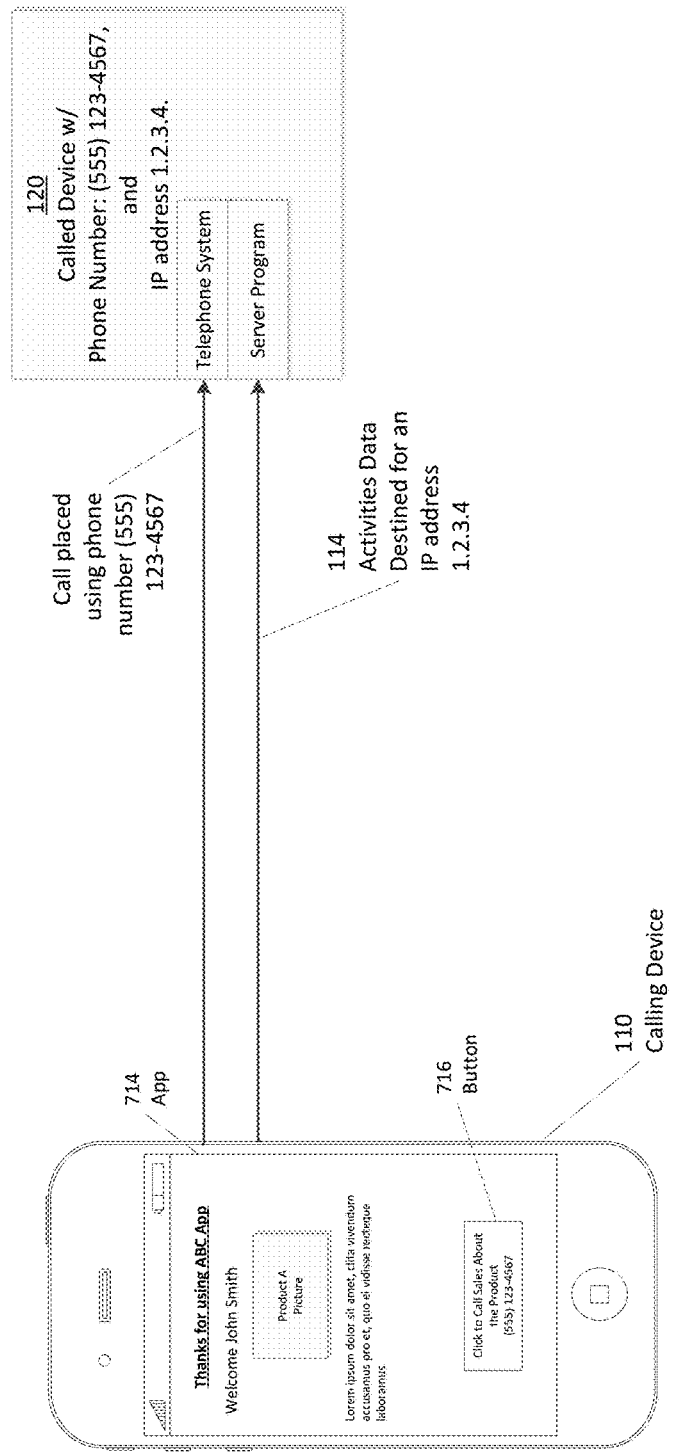
FIG. 7 illustrates an example of an app executing on a calling device in accordance with the disclosed embodiments.

FIG. 7 illustrates an example of an app 714 executing on calling device 110 in accordance with the disclosed embodiments. The example of FIG. 7 is similar to the example of FIG. 6, except that, instead of web browser 614 including clickable link 616, calling device 110 is executing app 714 that includes a button 716.

Figure 8:
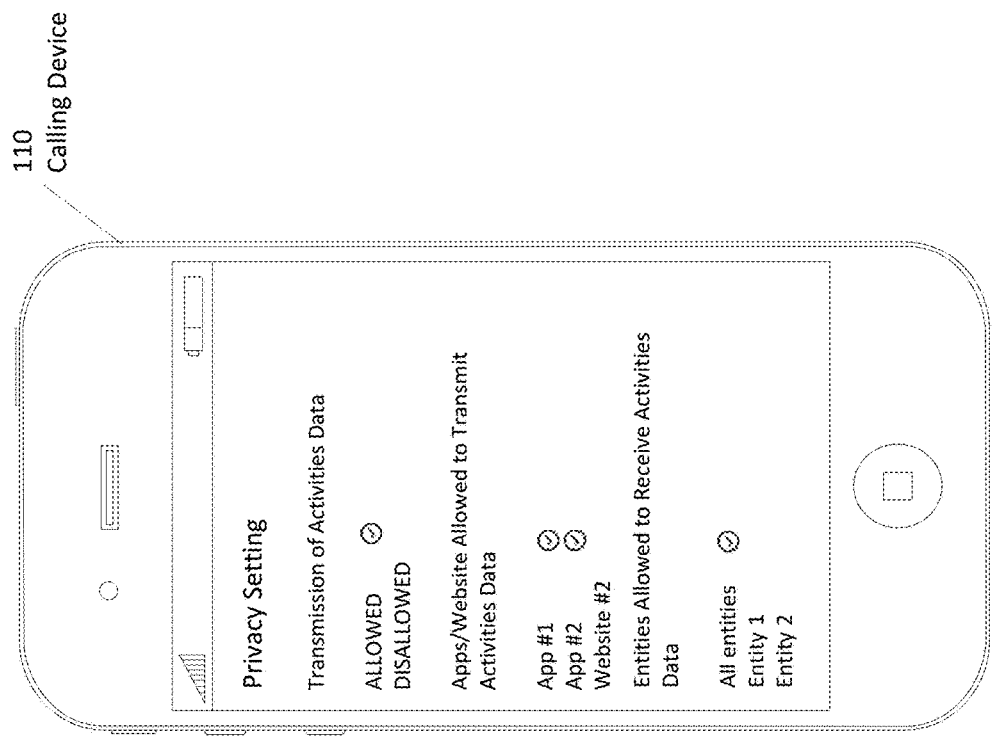
FIG. 8 illustrates an example of a privacy setting screen on a calling device in accordance with the disclosed embodiments.

FIG. 8 illustrates an example of a privacy setting screen on calling device 110 in accordance with the disclosed embodiments.

As discussed above, activities data 114 may include any data that may be available to calling device 110. Thus, in some embodiments, there may be data available to calling device 110 that a user of calling device 110 may not wish to share. In these embodiments, calling device 110 may implement a mechanism, such as the privacy setting screen shown in FIG. 8, enabling an authorized user of calling device 110 to approve/disapprove sharing of activities data 114 and/or select one or more types of device activities that may be included in activities data 114. In the example of FIG. 8, the privacy setting screen may further enable the authorized user of calling device 110 to select one or more devices that are authorized to receive activities data 114, one or more websites and apps that are authorized to transmit activities data 114, and one or more entities that are authorized to receive activities data 114.

Although not disclosed in detail herein, other techniques may be used to ensure that the privacy of the users are protected. For example, before transmitting the activities data, calling device 110 may display a prompt to verify that the activities data may be transmitted to another device. In another example, the activities data may be encrypted before it is transmitted to another device. In yet another example, copies of transmitted activities data may be saved for user's review.

An Example of a Process

Figure 9:
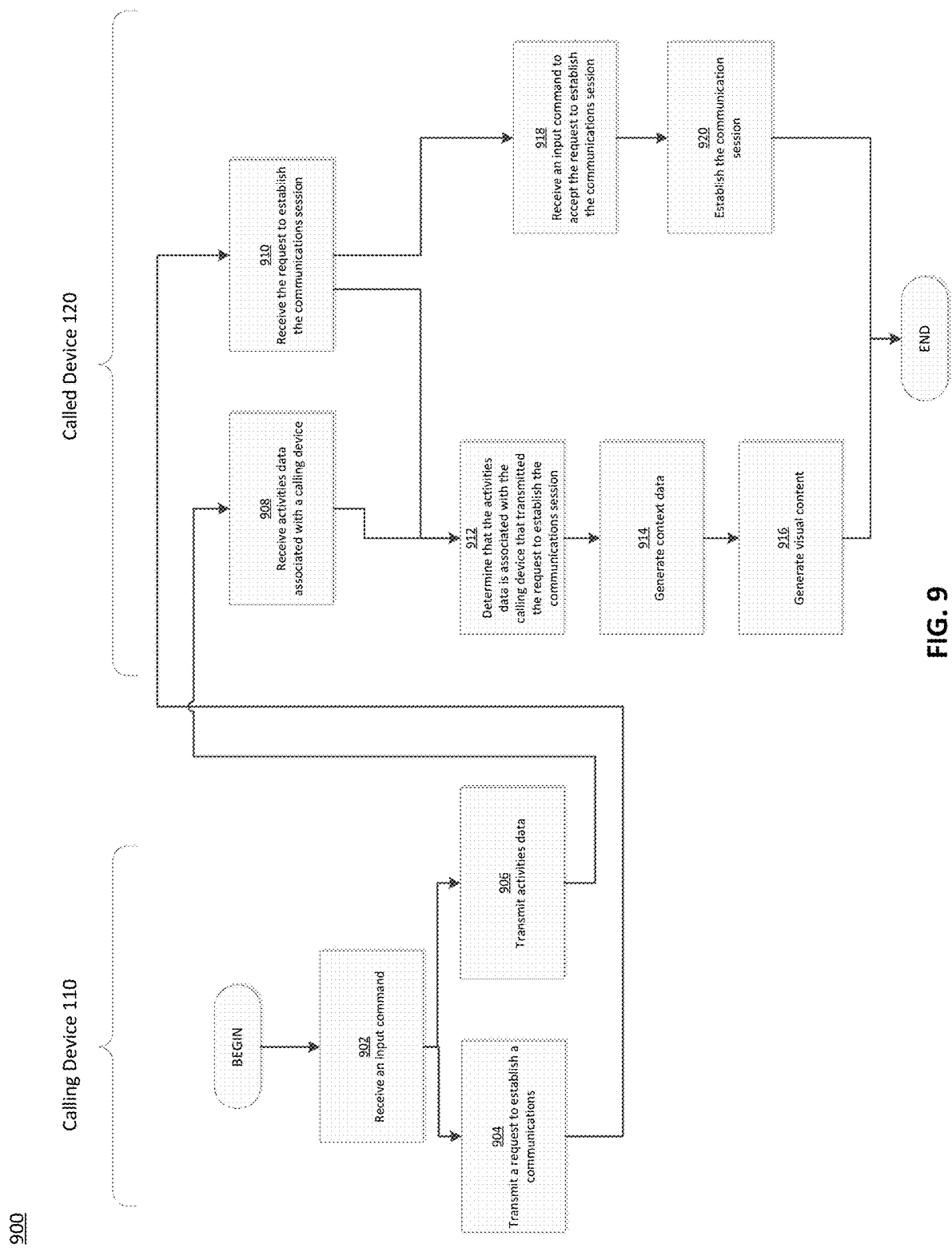
FIG. 9 illustrates an example of a process for generating context data in accordance with the disclosed embodiments.

FIG. 9 illustrates an example of a process 900 for generating context data associated with a communications session in accordance with the disclosed embodiments.

At a step 902, calling device 110 may receive an input command from a user requesting that a communications session be established with called device 120. For example, as discussed with respect to FIGS. 1 and 5A, an input command may be received at calling device 110 after the user enters a phone number and presses a dial button. In another example, as discussed with respect to FIGS. 1, 6, and 7, an input command may be received at calling device 110 after the user clicks or presses a link/button on a website or an application executing on calling device 110.

In some embodiments, the input command may include an identifier associated with a first subsystem of called device 120. For example, the input command may include a phone number associated with a telephone subsystem of called device 120, an IP address associated with a networking subsystem of called device 120, and/or a user name associated with a VoIP subsystem of called device 120.

At an optional step, as discussed with respect to FIG. 3, calling device 110 may determine an identifier associated with a second subsystem. In some embodiments, calling device 110 may determine the identifier associated with the second subsystem by accessing one or more identity databases 310 and/or one or more external data stores 330. In some embodiments, the identifier associated with the second subsystem may be embedded in the link/button on a website or the application executing on calling device 110.

At a step 904, calling device 110 may transmit request 112 to establish a communications session destined for called device 120. For example, as discussed with respect to FIGS. 1 and 5, the transmitting of the request may include placing a telephone call to a phone number. In another example, as discussed with respect to FIGS. 1, 6, and 7, the transmitting of the request may include attempting to establish a communications session such as a VoIP communications session, video conference, and/or chat session. In some embodiments, request 112 may include a first identifier associated with calling device 110.

At an optional step, calling device 110 may generate activities data 114. As discussed above with respect to FIG. 1, activities data 114 may be indicative of device activities of the calling device. For example, the activities data may include data indicative of internet activities of the calling device (e.g., internet browsing history), data indicative of activities within one or more software programs executing on the calling device (e.g., state data for an app executing on the calling device), data generated based on user inputs received at the calling device, and/or data generated based on visual content that was being displayed when an input command to transmit the request to establish a communications session was received.

At a step 906, calling device 110 may transmit activities data 114. In some embodiments, activities data 114 may be transmitted to called device 120 using the identifier associated with a second subsystem of called device 120. In some embodiments, activities data 114 may include a second identifier associated with calling device 110. The second identifier may be the same as, or different from, the first identifier associated with calling device 110.

At a step 908, called device 120 may receive request 112 to establish the communications session.

At a step 910, called device 120 may receive activities data 114 associated with calling device 110 that transmitted the request to establish the communications session.

At a step 912, called device 120 may determine that the received activities data 114 is associated with calling device 110 that transmitted request 112 to establish the communications session. In some embodiments, as discussed with respect to FIG. 1, called device 120 may determine that the received activities data 114 is associated with calling device 110 that transmitted the request 112 to establish the communications session using the first identifier included in request 112 and the second identifier included in activities data 114. In some embodiments, the determination that the received activities data 114 is associated with calling device 110 that transmitted request 112 may include accessing one or more of identity databases 310 and/or external data sources 330. In embodiments where calling device called device 120 has access to two or more of identity databases 310 and/or external data sources 330, called device 120 may select one or more of identity database 310 and/or external data sources 330 based on at least a portion of the first identifier and/or the second identifier. Additionally, or alternatively, called device 120 may select one or more of identity database 310 and/or external data sources 330 based on a type of the first identifier and/or a type of the second identifier.

At a step 914, called device 120 may generate context data associated with the communications session based on the received activities data 114. Alternatively, called device 120 may transmit at least a portion of activities data 114 and/or request 112 to a context generator 320, and receive context data generated by context generator 320. In some embodiments, the context data may be generated further based on request 112.

The context data may include, for example, identification of products, or types of products, that the user of the calling device is likely to be interested in discussing during the communications session, identification of reasons for requesting a communications session, identities associated with the user of the calling device, purchase history of the user of the calling device, personal information of the user of the calling device, and shopping preferences of the user of the calling device.

At a step 916, called device 120 may generate visual content based on the generated context data. The visual content may include, for example, at least a portion of the context data. Alternatively, or additionally, the visual content may include, for example, data generated based on at least a portion of the context data. For example, the visual content may include a chart and/or a table that is generated based on the context data.

At a step 918, called device 120 may receive an input command from a user of the called device to accept the request to establish the communications session.

At a step 920, called device 120 may establish the communications session.

Automatically Identifying a Calling Device and/or its User

Figure 10:
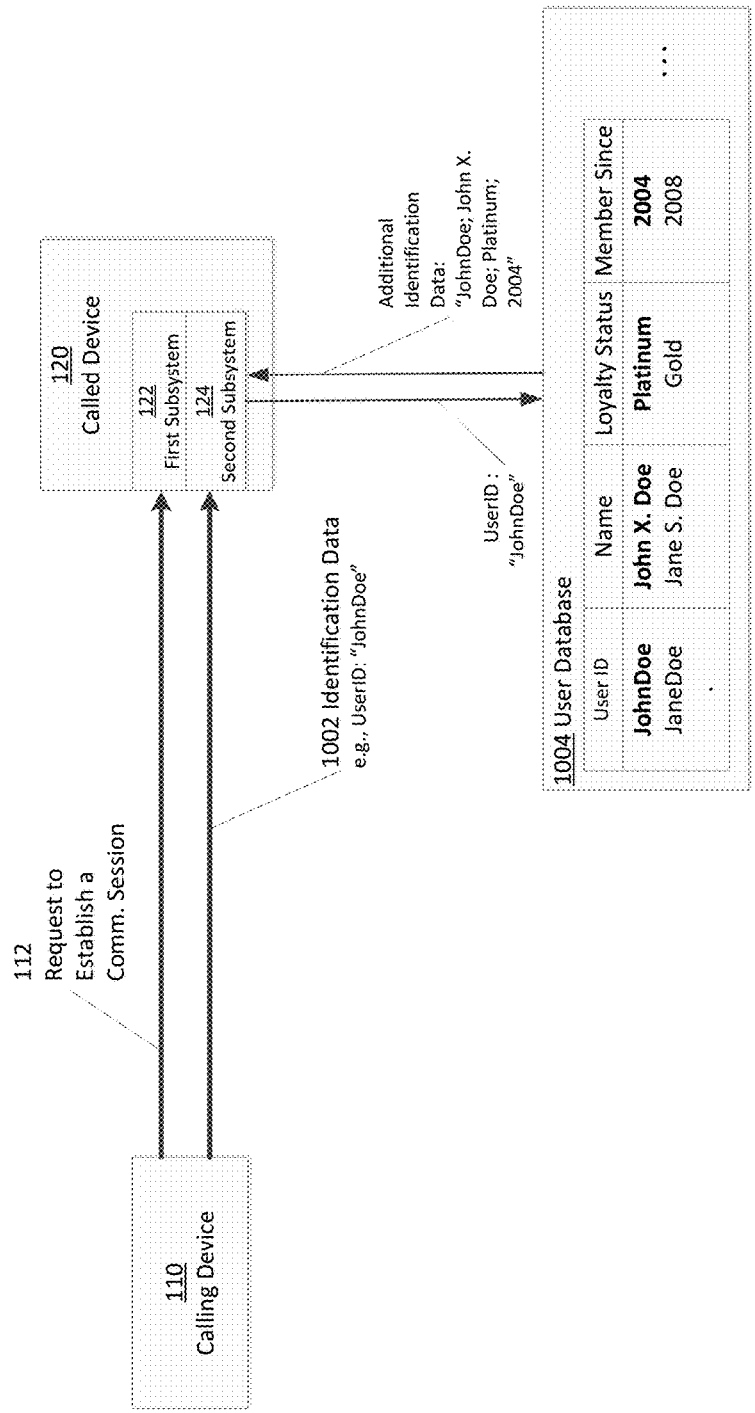
FIG. 10 illustrates an example of a communications system in accordance with the disclosed embodiments.

FIG. 10 illustrates an example of a communications system 1000 in which concepts consistent with the principles of the invention may be implemented. In system 1000, called device 120 (or called system) is capable of automatically identifying calling device 110 (or a user of such a device) that transmitted a request to establish a communications session (e.g., by initiating a telephone call). In particular, called device 120 may be capable of automatically identifying calling device 110 (e.g., determine user's name, member type, loyalty status, etc.) without requiring a user of calling device 110 to manually (e.g., verbally) provide identification information, such as a username and a social security number, to called device 120. Such a system may be useful, for example, to prevent any human operator of called device 120 from handling sensitive information, such as social security numbers. Such a system may also increase the speed at which calling device 110 is identified by eliminating manual data entry processes typically required by conventional systems.

In some embodiments, after calling device 110 is identified, called device 120 may use the identity information to provide a personalized communications experience to calling device 110. For example, called device 120 may use calling device 110 user's full name in an automated greeting once the communications session is established. In some embodiments, after calling device 110 is identified, called device 120 (or its user) can use the identity information to accept, terminate, or transfer the communications session (before or after the session is established). For example, if calling device 110 is identified as a device of a "platinum" member, the incoming call may be automatically transferred to a more experienced customer service representative or a representative that has a shorter waiting time. In another example, if a user of calling device 110 is identified as a problematic caller (e.g., a banned user), called device 120 may automatically decline request 112.

As shown in FIG. 10, system 1000 is similar to system 100 of FIG. 1. For example, similar to calling device 110 of FIG. 1, calling device 110 in FIG. 10 may transmit a request to establish a communications session 112 to first subsystem 122 of called device 120, and the request may include a first identifier associated with calling device 110 (e.g., phone number). As discussed above, first subsystem 122 may include, for example, a telephone system for receiving telephone calls or a VoIP system for receiving VoIP calls.

But, instead of (or in addition to) activities data 114, calling device 110 in FIG. 10 may transmit identification data 1002 to called device 120 (separately from request 112). As shown in FIG. 1, identification data 1002 may be received at second subsystem 124 of called device 120. Second subsystem 124 may include, for example, a server program or a cloud-based application programming interface (API) for directly or indirectly receiving identification data 1002 from calling device 110. In FIG. 10, the first and second subsystems are shown to be a part of called device 120, but in some embodiments, one or both subsystems may be external to called device 120.

In some embodiments, second subsystem 124 may be external and/or remote to called device 120. For example, second subsystem 124 may be operated by a third party, and ensuring that the authentication data is not exposed to called device 120. In this example, the external/remote system 124 may be queried for the authentication results/information.

As used herein, identification data 1002 may be any data that can be used to determine an identity associated with calling device 110 and/or its user. In FIG. 10, for example, identification data 1002 may include a piece of personally identifiable information (PII) (e.g., user ID, email address, phone number) that can be used by called device 120 to access additional information about calling device 110 and/or a user of calling device 110. In particular, second subsystem 124 of called device 120, using a user ID included in identification data 1002, may query a user database 1004 to access additional data such as name, loyalty status, and "member since" data associated with the user ID that is provided as a part of identification data 1002.

In some embodiments, similar to activities data 114, identification data 1002 may include a second identifier (e.g., IP address, IMEI, phone number) associated with calling device 110. The first and second identifiers may be the same or different. In some embodiments, called device 120 may use the second identifiers may be used to query the additional identification data from user database 1004. In some embodiments, called device 120 may identify calling device 110 after receiving request 112. But, in some embodiments, called device 120 may identify calling device 110 after receiving request 112 and after called device 120 accepts request 112 (e.g., by taking the incoming call). Calling device 110 may transmit identification data 1002 before or after request 112. In some embodiments, identification data 1002 may be transmitted by calling device 110 in response to calling device 110 transmitting request 112 (e.g., in response to a user initiating a telephone call).

Similar to activities data 114 in FIGS. 5A-5C, calling device 110 may determine the destination of identification data 1002 in a number of ways. For example, calling device 110 may have access to a database containing a list of phone numbers and an IP address that is associated with each phone number. After a user enters the phone number, calling device 110 (or dialing software program 500) may access such a database to determine the IP address associated the entered phone number. Subsequently, calling device 110 may transmit the identification data 1002 to called device 120 using the associated IP address. In some embodiments, the database may be included in calling device 110. Alternatively, or additionally, the database may be external to the calling device 110. In another example, identification data 1002 may be forwarded to an identification data forwarder (similar to activities data forwarder 610 in FIG. 5B). After receiving identification data 1002, the identification data forwarder may determine the IP address associated with the phone number (e.g., by accessing database 510) and forward the activities data 114 to the associated IP address. In some embodiments, identification data forwarder may include database 510. In both examples, the record that associates a phone number to an IP address may be updated by an authorized user associated with called device 120. As an example, businesses and/or individuals may add, modify, or remove records associating their phone number(s) with IP addresses. Further, businesses and/or individuals may indicate in the records types of information that the identification data forwarder should forward to the IP addresses. This information may be used by the identification data forwarder to determine the type of information that may be forwarded to a particular IP address.

In some embodiments, the identification data forwarder may use a verification mechanism to validate that calling device 110 is indeed associated with the identification data 1002.

After receiving both request 112 and identification data 1002, called device 120 may determine that identification data 1002 received from a calling device (e.g., calling device 110) is associated with a particular request (e.g., request 112) transmitted by the same calling device (e.g., calling device 110). Called device 120 may determine that identification data 1002 is associated with a particular request in a number of ways. For example, by comparing the first and second identifiers (e.g., phone number of calling device 110) included in the received request 112 and identification data 1002, respectively, called device 120 may identify a pending request (i.e., request 112) that was transmitted by the same calling device that transmitted identification data 1002. As used herein, a pending request may refer to any request that did not yet result in an established communications session or a request where the resulting communication session has not yet been terminated. In situations where there are multiple pending requests transmitted by the same calling device that transmitted identification data 1002, called device 120 may use the latest pending request or use other information (e.g., current date/time, difference between when a request was received and when authentication data was received, a time-to-live information included in the requests) to identify the request associated with identification data 1002. In some embodiments, called device 120 may determine that identification data 1002 is associated with a particular request by analyzing prior communications records. In some embodiments, called device 120 may determine that identification data 1002 is associated with a particular request by performing a challenge/response verification and/or an SMS-based verification.

Inversely, in some embodiments, using the first and second identifiers included in the received request 112 and authentication data 1002, called device 120 may identify identification data (i.e., identification data 1002) that was transmitted by the same calling device that transmitted request 112. In situations where there are multiple sets of identification data transmitted by the same calling device that transmitted request 112, called device 120 may use the latest identification data or use other information (e.g., current date/time, difference between when a request was received and when authentication data was received) to identify the identification data associated with the received request 112.

In embodiments where the first and second identifiers are the same, called device 120 may compare the identifiers included the received request 112 and authentication data 1002 to determine that they were transmitted by the same calling device. In embodiments where the first and second identifiers are different, called device 120 may query, using the first and second identifiers, data stored identity database 310 of FIG. 3 and/or data provided by external data sources 330 described in FIG. 3 to determine that request 112 and authentication data 1002 were transmitted by the same calling device. In one example, the first identifier may be a phone number and the second identifier may be an email address. Here, called device 120 may look up a customer database (e.g., database 310 of FIG. 3) for a customer that is associated with both the phone number and the email address.

In system 1000, based on the identification of calling device 110, second subsystem 124 of called device 120 may cause (e.g., control and/or instruct) first subsystem 122 to accept, decline, or reroute an incoming request 112. For example, if calling device 110 is determined not to be a customer, second subsystem 124 may cause first subsystem 122 to decline the incoming telephone call. In another example, if calling device 110 is determined to be a customer that has a high loyalty status, second subsystem 124 may cause first subsystem 122 to route the incoming call (before or after accepting the call) to a customer service professional that may be more experienced or has a shorter wait time. In system 1000, based on the identification of calling device 110, second subsystem 124 of called device 120 may cause first subsystem 122 to provide a particular response(s) via the established communications session. For example, second subsystem 124 may cause first subsystem 122 to play a personalized greeting via the established communications session.

Automatically Authenticating a Calling Device

Figure 11:
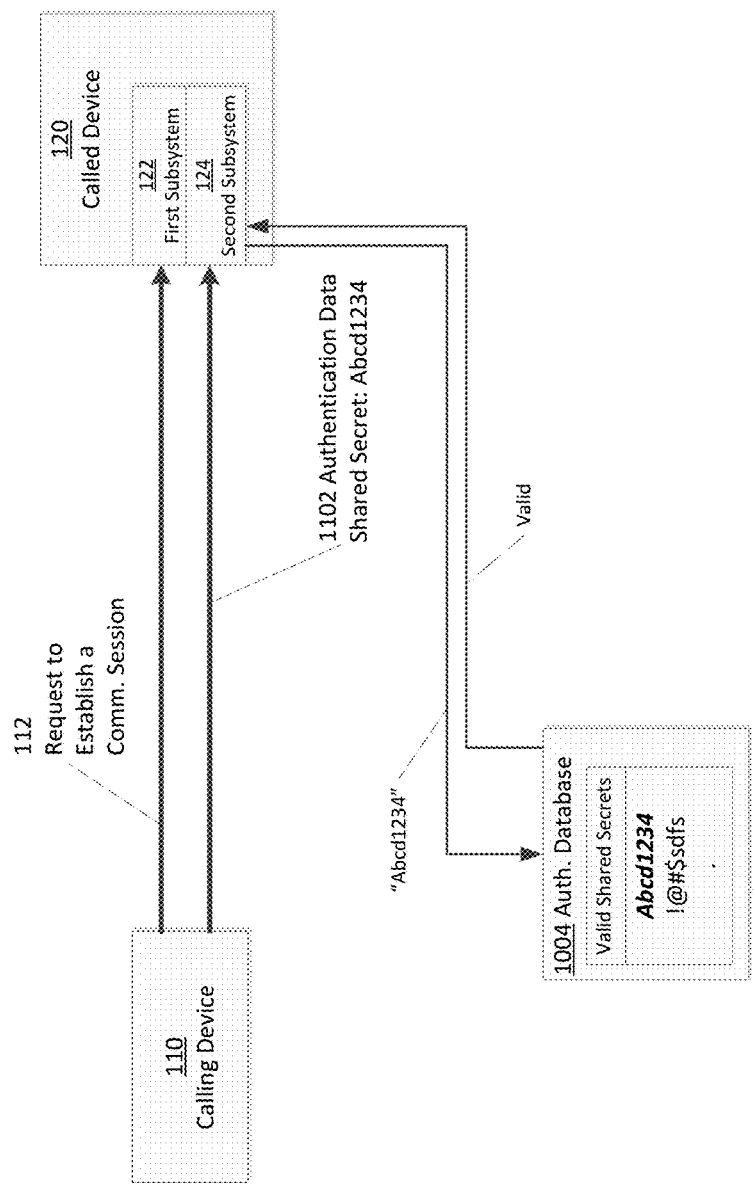
FIG. 11 illustrates an example of a process for automated identification/authentication of a calling device in accordance with the disclosed embodiments.

FIG. 11 illustrates another example of a communications system 1100 in which concepts consistent with the principles of the invention may be implemented. System 1100 is similar to system 1000 of FIG. 10, except that instead of, or in addition to, identification data 1002 and/or activities data 114, calling device 110 transmits authentication data 1102 to called device 120. As used herein, authentication data 1102 may be any data that can be used to verify that calling device 110 or a user of calling device 110 is an authorized device or user.

In the example of FIG. 11, an authorized device/user may be a device/user that is registered with a system associated with called device 120. For example, an authorized device/user may be a registered user/device (e.g., a customer account holder) on an e-commerce website associated with called device 120 (e.g., operated by the same company). In another example, an authorized device/user may be a device/user having cookies from the e-commerce website associated with called device 120 and/or a device executing a web browser associated with called device 120. In another example, an authorized device/user may be a user/device registered an enterprise system (e.g., an employee account on a company's accounting/payroll system, a company mobile phone) associated with called device 120. In some embodiments, an authorized device/user may be a device/user that is registered on a third-party system. For example, an authorized device/user may be a device/user that is registered on a social media network of which called device 120 is also a member.

In FIG. 11, authentication data 1102 is shown to include a shared secret (i.e., "Abcd1234") that is only known to called device 120 (or a system that called device 120 is a part of) and authorized users/devices, such as calling device 110 or its user(s). After receiving authentication data 1102, second subsystem 124 of called device 120 may use perform an authentication process using authentication data 1102. For example, second subsystem 124 may verify whether the shared secret "Abcd1234" is a valid shared secret by querying authentication database 1004 that includes all valid shared secrets. In response, authentication database 1004 may return an indicator of whether the shared secret provided by second subsystem 124 is a valid shared secret. Authentication database 1004 may be local to called device 120 and/or be a remotely accessible database.

In system 1000, based on the returned indicator, second subsystem 124 of called device 120 may cause first subsystem 122 to accept, decline, or reroute an incoming request 112. For example, if the shared secret is determined to be invalid, second subsystem 124 may indicate to first subsystem 122 that the shared secret is invalid; first subsystem 122, based on the indication, may decline the incoming telephone call. In another example, second subsystem 124 may control first subsystem 122 (e.g., using an API associated with first subsystem 122) to route the incoming call to a customer service professional if the shared secret is determined to be valid and to a sales professional if the shared secret is determined to be invalid.

Additionally, or alternatively, in system 1000, based on the returned indicator, second subsystem 124 of called device 120 may cause first subsystem 122 (e.g., automated telephone answering system) to restrict/allow access to certain information. For example, if the shared secret is determined to be valid, second subsystem 124 may provide a token (e.g., certificate) generated based on authentication data 1102 to first subsystem 122; first subsystem 122, using the token, may access sensitive information (e.g., company directory, internal schedule) and provide them to calling device 110. On the other hand, if the shared secret is determined to be invalid, second subsystem 124 may refuse to provide a token first subsystem 122, and first subsystem 122 may deny access to sensitive information even when requested by calling device 110.

Figure 12:
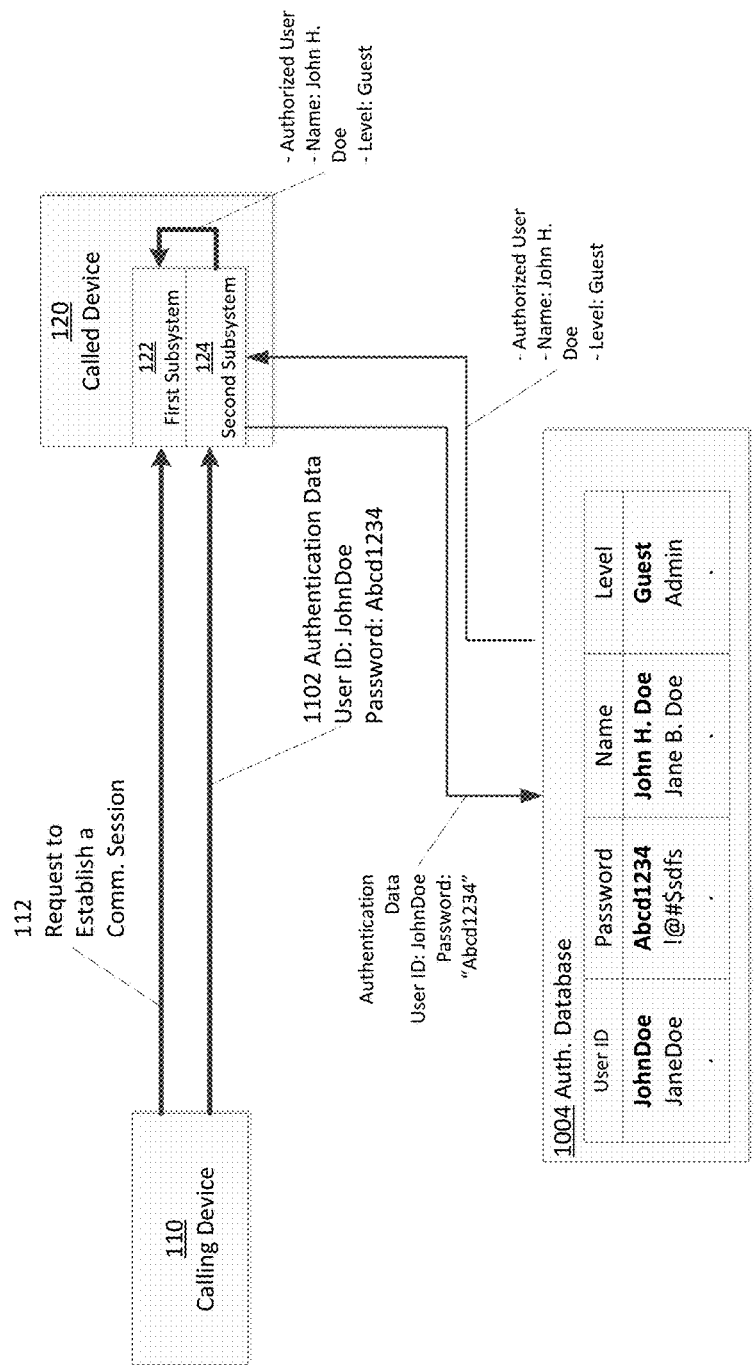
FIG. 12 illustrates an example of a communications system in accordance with the disclosed embodiments.

FIG. 12 illustrates another example of a communications system 1200 in which concepts consistent with the principles of the invention may be implemented. System 1200 is similar to system 1100 of FIG. 11, except that instead of, or in addition to, shared secret, authentication data 1102 includes a login credential such as a user ID (e.g., "John-Doe") and a corresponding password (e.g., "Abcd1234"). The login credential can be used by called device 120 to determine whether the calling device and/or its user is authorized an authorized device/user as well as identifying the device/user. In some embodiments, the login credential may enable called device 120 to determine a level of access authorized for the device/user. Similar to system 1100 of FIG. 11, in system 1200, an authorized device/user may be a device/user that is registered with a system associated with called device 120.

In FIG. 12, authentication data 1102 is shown to include a login credential (i.e., "Abcd1234") associated calling device 110 and/or its user. After receiving authentication data 1102, second subsystem 124 of called device 120 may perform an authentication process using authentication data 1102. In particular, second subsystem 124 may verify the login credential by querying authentication database 1004. In response, authentication database 1004 may return an indicator of whether the login credential provided by second subsystem 124 is valid. In some embodiments, authentication database 1004 may further return additional information associated with the credential. For example, in FIG. 12, authentication database returns the full name associated with the user ID as well as the level of access granted to the particular user. In another example, authentication database 1004 may return any loyalty status the user ID may be associated with and/or the number of years the user has been a member.

In some embodiments, authentication database may return other information associated with calling device 110 and/or its user, such as their loyalty status, status of their college application, status of their health insurance claim, and/or status of their various travel reservations.

In some embodiments, authentication data 1102 may include digital certificates associated with calling device 110 and/or a user of calling device 110. In some embodiments authentication data 1102 may include a digital signature signed with a private key associated with calling device 110 and/or a user of calling device 110. Called device 120 may verify the digital signature by querying authentication data 1004 for a public key associated with calling device 110 (e.g., using an identifier included in authentication data 1102), and verifying the digital signature using the retrieved public key.

In system 1000, based on the authentication result, second subsystem 124 of called device 120 may cause (e.g., control and/or instruct) first subsystem 122 to accept, decline, or reroute an incoming request 112. For example, if the login credential is determined to be invalid, second subsystem 124 may control first subsystem 122 to decline the incoming telephone call. In another example, second subsystem 124 may provide the returned indicator to first subsystem 122, and first subsystem 122, based on the indicator, may route the incoming call to a customer service professional if the login credential is determined to be valid and to a sales professional if the login credential is determined to be invalid. In yet another example, second subsystem 124 may cause first subsystem 122 to route the incoming call to a more experienced customer service professional if the login credential is determined to be valid and loyalty status is "platinum."

In some embodiments, based on the authentication result, second subsystem 124 of called device 120 may cause first subsystem 122 (e.g., automated telephone answering system) to restrict/allow access to certain information. For example, if the login credential is determined to be valid and the level of access associated with the user ID is "full access" or "admin," calling device 110 may be allowed to access sensitive information (e.g., access company directory and internal schedule via an automated call answering system) via first subsystem. On the other hand, if the login credential is determined to be valid and the level of access associated with the user ID is "guest," calling device 110 may only access public information via first subsystem.

In some embodiments, data retrieved from authentication database 1004 (e.g., the user ID) may be used to retrieve additional identity information, for example, from a user database 1006 (e.g., user information from user database 1006) or publicly accessible information on a social media network. The additional information may be provided to first subsystem 122 and/or further relied upon by second subsystem 124 to authenticate called device 110 and/or its user.

Figure 13:
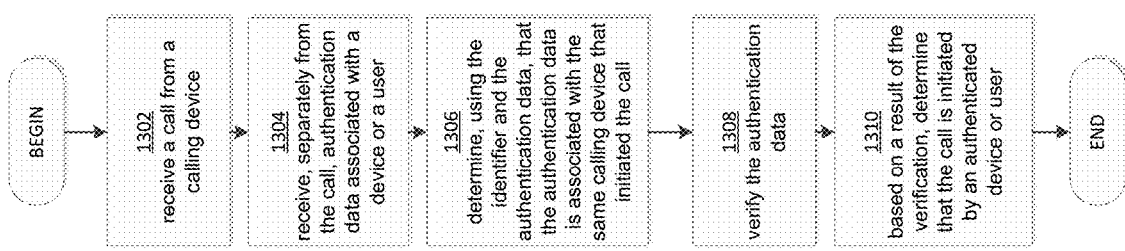
FIG. 13 illustrates an example of a process for automatically authenticating a calling device in accordance with the disclosed embodiments.

FIG. 13 illustrates an example of a process 1300 for automatically authenticating a calling device 110 in accordance with the disclosed embodiments.

At a step 1302, a called device may receive a call from a calling device. The call may include an identifier associated with the calling device. In some embodiments, the call may be a telephone call and the identifier may be a phone number or Caller ID Name (CNAM) associated with the phone number. In some embodiments, the call may be a VoIP call and the identifier may be a user identifier or an IP address. In some embodiments, the call may be received at a first subsystem of calling device. The first subsystem may be, for example, an automated telephone system or VoIP system. The first subsystem may be internal or external to the called device.

At a step 1304, the called device may receive, separately from the call, authentication data associated with a device or a user. In some embodiments, the authentication data may be received by a server program executing on the called device or a device associated with the called device (e.g., a server operated by an owner of the called device). In some embodiments, the authentication data may be received by a cloud-based API associated with called device.

At a step 1306, the called device may determine, using the identifier and the authentication data, that the authentication data is associated with the same device that initiated the call (i.e., the calling device). In one example, the called device may compare the identifier included in the call and another identifier included in the authentication data. In another example, the called device may query a database to determine whether the identifier included in the call and another identifier included in the authentication data are associated with the same user/device. In some embodiments, the authentication data may include a shared secret. In some embodiments, the authentication data may include a login credential. In some embodiments, the authentication data may include digital certificates and/or signatures. In some embodiments, authentication data may include identification data, such as, but not limited to, name, address, loyalty status, and level of access.

At a step 1308, the called device may verify the authentication data. For example, the called device may determine whether the login credential, shared secret, digital certificate, and/or digital signature included in the authentication data is valid by querying an authentication database. The authentication database may be internal or external to the called device.

At a step 1310, based on a result of the verification, the called device may determine that the call is initiated by an authenticated device or user. In some embodiments, determining that the call is initiated by an authenticated device or user may include providing access-controlled information (e.g., personal finance information) to the authenticated device or user. In some embodiments, determining that the call is initiated by an authenticated device or user may include transferring to another device/user (e.g., a human operator or a device with a shorter wait time). In some embodiments, determining that the call is initiated by an authenticated device or user may include making additional options (e.g., access to member only options) available by an automated answering system handling the call.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

We claim:

1. A computer-implemented method for establishing a communications session, the method comprising:
   receiving, from a calling device at a first subsystem, a request to establish the communications session, wherein the request includes a first identifier associated with the calling device, the first identifier being used to identify the calling device by its communications system;
   receiving, at a second subsystem separate from the first subsystem, and separately from the request, activities data associated with the calling device that transmitted the request to establish the communications session, wherein the activities data:
   (i) includes a second identifier associated with the calling device, the second identifier being different form the first identifier, and
   (ii) is indicative of device activities of the calling device and is indicative of data generated based on visual content that was being displayed on the calling device when an input command to transmit the request to establish the communications session was received;
   determining, using the first identifier and the second identifier, that the received activities data is associated with the calling device that transmitted the request to establish the communications session; and
   establishing the communications session in response to receiving, from a user of the calling device, the input command to accept the request.

2. The method of claim 1, further comprising generating context data associated with the communications session based on the received activities data.

3. The method of claim 2, further comprising generating visual content based on the generated context data.

4. The method of claim 3, wherein the visual content includes data that was displayed or is being displayed on the calling device.

5. The method of claim 3, wherein the visual content includes data generated by one or more software programs executing on the calling device.

6. The method of claim 3, further comprising:
   receiving, at the second subsystem a further activities data associated with the calling device based on the user operating the calling device; and
   dynamically generating a further visual content based on the further activities data.

7. The method of claim 1, wherein the determining that the received activities data is associated with the calling device that transmitted the request to establish the communications session includes:
   transmitting the first identifier to an identity database;
   receiving a set of identifiers related to the first identifier; and
   determining whether the set of identifiers includes the second identifier.

8. A computing system for establishing a communications session, the computing system comprising:
   a memory configured to store instructions;
   one or more processors, coupled to the memory and configured to process the stored instructions to:
      receive, from a calling device, a request to establish the communications session, wherein the request includes a first identifier associated with the calling device, the first identifier being used to identify the calling device by its communications system;
      receive, separately from the request, activities data associated with the calling device that transmitted the request to establish the communications session, wherein the activities data:
      (i) includes a second identifier associated with the calling device, the second identifier being different from the first identifier, and
      (ii) is indicative of device activities of the calling device and is indicative of data generated based on visual content that was being displayed on the calling device when an input command to transmit the request to establish the communications session was received;
      determine, using the first identifier and the second identifier, that the received activities data is associated with the calling device that transmitted the request to establish the communications session; and
      establish the communications session in response to receiving, from a user of the calling device, the input command to accept the request.

9. The system of claim 8, wherein the one or more processors are further configured to generate context data associated with the communications session based on the received activities data.

10. The system of claim 9, wherein the one or more processors are further configured to generate visual content based on the generated context data.

11. The system of claim 10, wherein the visual content includes data that was displayed or is being displayed on the calling device.

12. The system of claim 10, wherein the visual content includes data generated by one or more software programs executing on the calling device.

13. The system of claim 10, wherein the one or more processors are further configured to:
   receive a further activities data associated with the calling device based on the user operating the calling device; and
   dynamically generate a further visual content based on the further activities data.

14. The system of claim 8, wherein the one or more processors are configured to determine that the received activities data is associated with the calling device that transmitted the request to establish the communications session based on:
   transmitting the first identifier to an identity database;
   receiving a set of identifiers related to the first identifier; and
   determining whether the set of identifiers includes the second identifier.

15. A non-transitory computer-readable storage medium stores instructions that when executed by a computing system, cause the computing system to perform operations for establishing a communications session, the operations comprising:
   receiving, from a calling device at a first subsystem, a request to establish the communications session, wherein the request includes a first identifier associated with the calling device, the first identifier being used to identify the calling device by its communications system;

receiving, at a second subsystem separate from the first subsystem, and separately from the request, activities data associated with the calling device that transmitted the request to establish the communications session, wherein the received activities data:
(i) includes a second identifier associated with the calling device, the second identifier being different from the first identifier, and
(ii) is indicative of device activities of the calling device and is indicative of data generated based on visual content that was being displayed on the calling device when an input command to transmit the request to establish the communications session was received;

determining, using the first identifier and the second identifier, that the received activities data is associated with the calling device that transmitted the request to establish the communications session; and establishing the communications session in response to receiving, from a user of the calling device, the input command to accept the request.

16. The non-transitory computer-readable medium of claim 15, wherein the operations further comprise generating context data associated with the communications session based on the received activities data.

17. The non-transitory computer-readable medium of claim 16, wherein the operations further comprise generating visual content based on the generated context data.

18. The non-transitory computer-readable medium of claim 17, wherein the visual content includes data that was displayed or is being displayed on the calling device.

19. The non-transitory computer-readable medium of claim 17, wherein the visual content includes data generated by one or more software programs executing on the calling device.

20. The non-transitory computer-readable medium of claim 17, wherein the operations further comprise:
receiving, at the second subsystem a further activities data associated with the calling device based on the user operating the calling device; and
dynamically generating a further visual content based on the further activities data.

* * * * *

UNITED STATES PATENT AND TRADEMARK OFFICE
CERTIFICATE OF CORRECTION

| | | |
|---|---|---|
| PATENT NO. | : 12,381,976 B2 | Page 1 of 1 |
| APPLICATION NO. | : 18/539905 | |
| DATED | : August 5, 2025 | |
| INVENTOR(S) | : Sena, Jr. et al. | |

It is certified that error appears in the above-identified patent and that said Letters Patent is hereby corrected as shown below:

In the Claims

In Column 30, Claim 16, Line 1, delete "medium" and insert -- storage medium --, therefor.

In Column 30, Claim 17, Line 5, delete "medium" and insert -- storage medium --, therefor.

In Column 30, Claim 18, Line 8, delete "medium" and insert -- storage medium --, therefor.

In Column 30, Claim 19, Line 12, delete "medium" and insert -- storage medium --, therefor.

In Column 30, Claim 20, Line 16, delete "medium" and insert -- storage medium --, therefor.

Signed and Sealed this
Thirtieth Day of September, 2025

John A. Squires
*Director of the United States Patent and Trademark Office*